(12) United States Patent
Zhang et al.

(10) Patent No.: US 11,138,285 B2
(45) Date of Patent: Oct. 5, 2021

(54) INTENT ENCODER TRAINED USING SEARCH LOGS

(71) Applicant: Microsoft Technology Licensing, LLC, Redmond, WA (US)

(72) Inventors: Hongfei Zhang, Seattle, WA (US); Xia Song, Redmond, WA (US); Chenyan Xiong, Bellevue, WA (US); Corbin Louis Rosset, Seattle, WA (US); Paul Nathan Bennett, Redmond, WA (US); Nicholas Eric Craswell, Seattle, WA (US); Saurabh Kumar Tiwary, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 335 days.

(21) Appl. No.: 16/296,054

(22) Filed: Mar. 7, 2019

(65) Prior Publication Data
US 2020/0285687 A1    Sep. 10, 2020

(51) Int. Cl.
| | |
|---|---|
| G06F 16/95 | (2019.01) |
| G06F 16/957 | (2019.01) |
| G06F 16/9532 | (2019.01) |
| G06F 16/9538 | (2019.01) |
| G06K 9/00 | (2006.01) |
| G06K 9/62 | (2006.01) |

(52) U.S. Cl.
CPC ...... *G06F 16/9574* (2019.01); *G06F 16/9532* (2019.01); *G06F 16/9538* (2019.01); *G06K 9/00483* (2013.01); *G06K 9/6215* (2013.01); *G06K 9/6257* (2013.01)

(58) Field of Classification Search
None
See application file for complete search history.

(56) References Cited

U.S. PATENT DOCUMENTS

| | | | |
|---|---|---|---|
| 9,405,856 B2 | 8/2016 | Marantz et al. | |
| 9,519,870 B2* | 12/2016 | Sarikaya | G06F 16/313 |
| 9,600,231 B1* | 3/2017 | Sun | G06F 16/953 |
| 10,706,450 B1 | 7/2020 | Tavernier | |

(Continued)

OTHER PUBLICATIONS

PCT Search Report and Written Opinion in PCT/US2020/015999, dated Apr. 24, 2020, 18 pages.

(Continued)

*Primary Examiner* — Son T Hoang

(57) ABSTRACT

A computer-implemented technique receives an input expression that a user submits with an intent to accomplish some objective. The technique then uses a machine-trained intent encoder component to map the input expression into an input expression intent vector (IEIV). The IEIV corresponds to a distributed representation of the intent associated with the input expression, within a vector intent vector space. The technique then leverages the intent vector to facilitate some downstream application task, such as the retrieval of information. Some application tasks also use a neighbor search component to find expressions that express an intent similar to that of the input expression. A training system trains the intent encoder component based on the nexus between queries and user clicks, as recorded in a search engine's search log.

22 Claims, 11 Drawing Sheets

(56) References Cited

U.S. PATENT DOCUMENTS

| | | | |
|---|---|---|---|
| 2011/0066650 A1* | 3/2011 | Fuxman | G06F 16/3349 |
| | | | 707/776 |
| 2011/0314010 A1* | 12/2011 | Ganti | G06F 16/2425 |
| | | | 707/728 |
| 2012/0290575 A1 | 11/2012 | Hu et al. | |
| 2013/0282682 A1 | 10/2013 | Batraski et al. | |
| 2014/0337005 A1* | 11/2014 | Abdel-Hady | G06F 16/35 |
| 2017/0032035 A1 | 2/2017 | Gao et al. | |
| 2019/0130231 A1* | 5/2019 | Liu | G06F 16/9574 |
| 2019/0140997 A1* | 5/2019 | Lewin-Eytan | G06F 16/9535 |
| 2019/0188295 A1* | 6/2019 | Sirotkovic | G06F 16/2425 |
| 2019/0197099 A1* | 6/2019 | Frolov | G06F 16/951 |
| 2020/0184307 A1* | 6/2020 | Lipka | G06F 16/9032 |

OTHER PUBLICATIONS

Lin, et al., "Question Answering from the Web Using Knowledge Annotation and Knowledge Mining Techniques," in Proceedings of the Twelfth International Conference on Information and Knowledge Management (CIKM '03), Nov. 2003, pp. 116-123.

Agichtein, et al., "Improving Web Search Ranking by Incorporating User Behavior Information," in Proceedings of the 29th Annual International ACM SIGIR Conference on Research and Development in Information Retrieval, Aug. 2006, pp. 19-26.

Bendersky, et al., "Parameterized Concept Weighting in Verbose Queries," in Proceedings of the 34th Annual International ACM SIGIR Conference on Research and Development in Information Retrieval, Jul. 2011, pp. 605-614.

Broder, Andrei, "A Taxonomy of Web Search," in ACM SIRGIR Forum, vol. 36, No. 2, Fall 2002, pp. 3-10.

Broder, et al., "Robust Classification of Rare Queries Using Web Knowledge," in Proceedings of the 30th Annual International ACM SIGIR Conference on Research and Development in Information Retrieval, Jul. 2007, pp. 231-238.

Carterette, et al., "TREC 2014 Web Track Overview," in Proceedings of The 23rd Text Retrieval Conference, Feb. 2015, 21 pages.

Cer, et al., "Universal Sentence Encoder," arXiv:1803.11175v2 [cs.CL], Apr. 12, 2018, 7 pages.

Croft, et al., "Search Engines: Information Retrieval in Practice," Addison-Wesley, 1st Ed., 2009, Amazon.com product page only, available at <<https://www.amazon.com/Search-Engines-Information-Retrieval-Practice-dp-0135756324/dp/0135756324/ref=mt_paperback?_encoding=UTF8&me=&qid=>>, accessed on Feb. 6, 2019, 6 pages.

Dai, et al., "Convolutional Neural Networks for Soft-Matching N-Grams in Ad-hoc Search," in Proceedings of the Eleventh ACM International Conference on Web Search and Data Mining, Feb. 5, 2018, pp. 126-134.

Devlin, et al., "BERT: Pre-training of Deep Bidirectional Transformers for Language Understanding," arXiv:1810.04805v1 [cs.CL], Oct. 11, 2018, 14 pages.

Diaz, et al., "Query Expansion with Locally-Trained Word Embeddings," in Proceedings of the 54th Annual Meeting of the Association for Computational Linguistics, Aug. 2016, pp. 367-377.

Downey, et al., "Heads and Tails: Studies of Web Search with Common and Rare Queries," in Proceedings of the 30th Annual International ACM SIGIR Conference on Research and Development in Information Retrieval, Jul. 2007, pp. 847-848.

Finkelstein, et al., "Placing Search in Context: The Concept Revisited," in ACM Transactions on Information Systems, vol. 20, No. 1, 2002, Jan. 2002, pp. 116-131.

Guo, et al., "A Deep Relevance Matching Model for Ad-hoc Retrieval," in Proceedings of the 25th ACM International on Conference on Information and Knowledge Management, Oct. 2016, pp. 55-64.

Hassan, et al., "Struggling or Exploring?: Disambiguating Long Search Sessions," in Proceedings of the 7th ACM International Conference on Web Search and Data Mining, Feb. 2014, pp. 53-62.

Hu, et al., "Understanding User's Query Intent with Wikipedia," in Proceedings of the 18th International Conference on World Wide Web, Apr. 2009, pp. 471-480.

Huang, et al., "Learning Deep Structured Semantic Models for Web Search Using Clickthrough Data," in Proceedings of the 22nd ACM International Conference on Information & Knowledge Management, Nov. 2013, pp. 2333-2338.

Kim, et al., "Character-Aware Neural Language Models," in Proceedings of the Thirtieth AAAI Conference on Artificial Intelligence, Feb. 2016, pp. 2741-2749.

Kuzi, et al., "Query Expansion Using Word Embeddings," in Proceedings of the 25th ACM International on Conference on Information and Knowledge Management, Oct. 2016, pp. 1929-1932.

Lavrenko, et al., "Relevance Based Language Models," in Proceedings of the 24th Annual International ACM SIGIR Conference on Research and Development in Information Retrieval, Sep. 2001, pp. 120-127.

Li, et al., "Learning Query Intent from Regularized Click Graphs," in Proceedings of the 31st Annual International ACM SIGIR Conference on Research and Development in Information Retrieval, Jul. 2008, 339-346.

Malkov, et al., "Efficient and Robust Approximate Nearest Neighbor Search Using Hierarchical Navigable Small World Graphs," arXiv:1603.09320v4 [cs.DS], 13 pages.

Metzler, et al., "A Markov Random Field Model for Term Dependencies," in Proceedings of the 28th Annual International ACM SIGIR Conference on Research and Development in Information Retrieval, Apr. 2005, pp. 472-479.

Mikolov, et al., "Distributed Representations of Words and Phrases and their Compositionality," in Proceedings of the 27th Advances in Neural Information Processing Systems, Dec. 2013, 9 pages.

Mnih, et al., "Learning Word Embeddings Efficiently with Noise-Contrastive Estimation," in Advances in Neural Information Processing Systems, Dec. 2013, 9 pages.

Nalisnick, et al., "Improving Document Ranking with Dual Word Embeddings," in Proceedings of the 25th International Conference Companion on World Wide Web. International World Wide Web Conferences Steering Committee, Apr. 2016, pp. 83-84.

Pang, et al., "Deeprank: A New Deep Architecture for Relevance Ranking in Information Retrieval," in Proceedings of the 2017 ACM on Conference on Information and Knowledge Management, Nov. 2017, pp. 257-266.

Pennington, et al., "GloVe: Global Vectors for Word Representation," in Proceedings of the 2014 Conference on Empirical Methods in Natural Language Processing, Oct. 2014, pp. 1532-1543.

Peters, et al., "Deep Contextualized Word Representations," in Proceedings of NAACL-HLT 2018, Jun. 2017, pp. 2227-2237.

Rekabsaz, et al., "Word Embedding Causes Topic Shifting; Exploit Global Context!," in Proceedings of the 40th International ACM SIGIR Conference on Research and Development in Information Retrieval, Aug. 2017, pp. 1105-1108.

Salton, et al., "Improving Retrieval Performance by Relevance Feedback," in Journal of the American Society for Information Science, vol. 41, No. 4, 1990, pp. 288-297.

Schnabel, et al., "Evaluation Methods for Unsupervised Word Embeddings," in Proceedings of the 2015 Conference on Empirical Methods in Natural Language Processing, Sep. 2015, pp. 298-307.

Shen, et al., "Building Bridges for Web Query Classification," in Proceedings of the 29th Annual International ACM SIGIR Conference on Research and Development in Information Retrieval, Aug. 2006, pp. 131-138.

Shen, et al., "Learning Semantic Representations Using Convolutional Neural Networks for Web Search," in Proceedings of the 23rd International Conference on World Wide Web, Apr. 2014, pp. 373-374.

Srivastava, et al., "Training Very Deep Networks," in Proceedings of the 28th International Conference on Neural Information Processing Systems, vol. 2, Dec. 2015, 9 pages.

Wang, et al., "GLUE: A Multi-Task Benchmark and Analysis Platform for Natural Language Understanding," arXiv:1804.07461v2 [cs.CL], Sep. 18, 2018, 13 pages.

(56) References Cited

OTHER PUBLICATIONS

Xiong, et al., "Query Expansion with Freebase," in Proceedings of the Fifth ACM International Conference on the Theory of Information Retrieval, Sep. 2015, pp. 111-120.

Xiong, et al., "End-to-end Neural Ad-hoc Ranking with Kernel Pooling," in Proceedings of the 40th Annual International ACM SIGIR Conference on Research and Development in Information Retrieval, Aug. 2017, pp. 55-64.

Zamani, et al., "Embedding-based Query Language Models," in Proceedings of the 2016 ACM International Conference on the Theory of Information Retrieval, Sep. 2016, pp. 147-156.

Zamani, et al., "Estimating Embedding Vectors for Queries," in Proceedings of the 2016 ACM International Conference on the Theory of Information Retrieval, Sep. 2016, pp. 123-132.

Zamani, et al., "Relevance-based Word Embedding," in Proceedings of the 40th International ACM SIGIR Conference on Research and Development in Information Retrieval., Aug. 2017, pp. 505-514.

Zamani, et al., "Neural Ranking Models with Multiple Document Fields," in Proceedings of the Eleventh ACM International Conference on Web Search and Data Mining, Feb. 5, 2018, pp. 700-708.

Zhao, et al., "Term Necessity Prediction," in Proceedings of the 19th ACM International on Conference on Information and Knowledge Management, Oct. 2010, pp. 259-268.

Zheng, et al, "Learning to Reweight Terms with Distributed Representations," in Proceedings of the 38th Annual International ACM SIGIR Conference on Research and Development in Information Retrieval, Aug. 2015, pp. 575-584.

Li, et al., "Approximate Nearest Neighbor Search on High Dimensional Data—Experiments, Analyses, and Improvement (v1.0)," arXiv:1610.02455v1 [cs.DB], Oct. 8, 2016, 26 pages.

Zhang, et al., "Generic Intent Representation in Web Search," in Proceedings of the 42nd International ACM SIGIR Conference on Research and Development in Information Retrieval, Jul. 2019, pp. 65-74.

Yin, et al., "Building Taxonomy of Web Search Intents for Name Entity Queries," in Proceedings of the 19th International Conference on World Wide Web, Apr. 2010, pp. 1001-1010.

\* cited by examiner

FIG. 4

Second Illustrative Retrieval Application 402

- Submitted Query, $q_1$ → Information Retrieval (IR) Engine 404
- $I_{q1}$ → Information Retrieval (IR) Engine 404
- Neighbor Search Component 118 ↔ IR Engine ($q_1$ up; $(q_{1a}, q_{1b}, ..., q_{1n})$ down)
- IR Engine ↔ Search Index 406: $(q_1, q_{1a}, q_{1b}, ..., q_{1n})$ out; Information Item Identifiers in
- Information Items (e.g., Documents) 408 → Search Index 406
- IR Engine → Output-Generating Component 124 (Information Item Identifiers) → List of Information Items

FIG. 5

Third Illustrative Retrieval Application 502

- Submitted Query, $q_1$ → Information Retrieval (IR) Engine 504
- $I_{q1}$ → IR Engine 504
- Neighbor Search Component 104 ↔ IR Engine ($q_1$ up; $(q_{1a}, q_{1b}, ..., q_{1n})$ down)
- IR Engine → Search Index 506: $q_1$ out; Results in
- Information Items (e.g., Documents) 508 → Search Index 506
- IR Engine → Suggestion-Generating Component 510: $(q_{1a}, q_{1b}, ..., q_{1n})$
- Output-Generating Component 125 → Suggestions

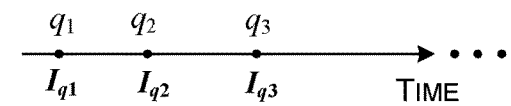
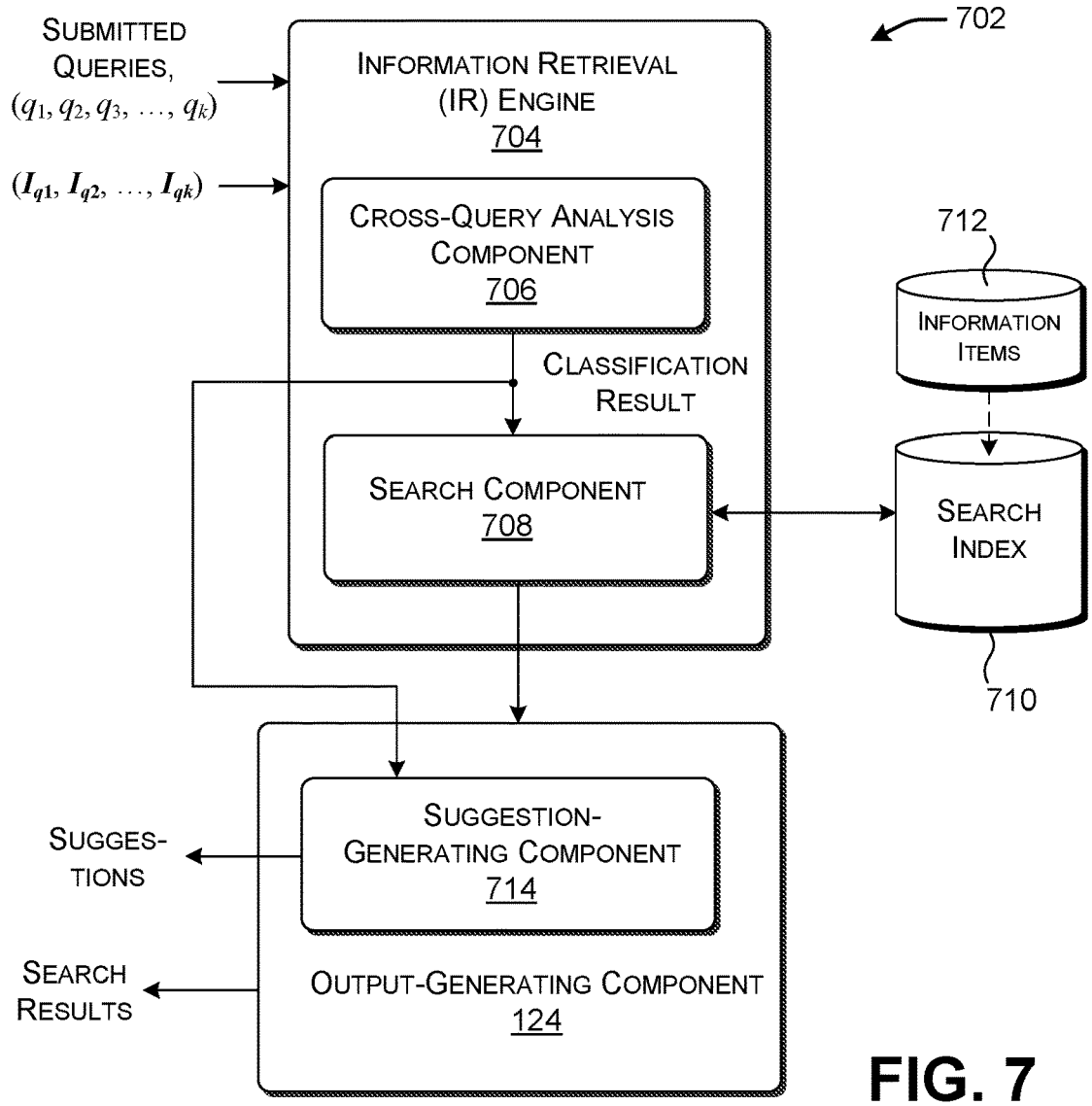
FIG. 7
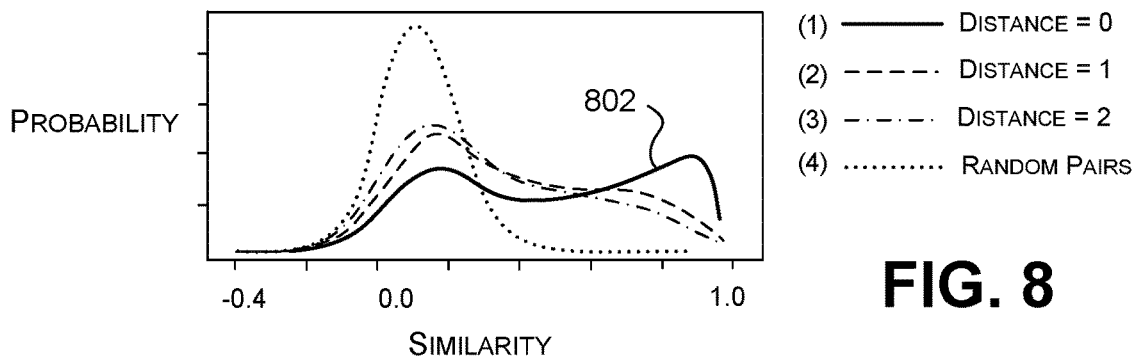
FIG. 8

OVERVIEW OF OPERATION OF THE INFORMATION TRAINING SYSTEM
1302

FORMULATE TRAINING EXAMPLES FROM A SEARCH LOG PRODUCED BY A SEARCH ENGINE, THE TRAINING EXAMPLES INCLUDING POSITIVE EXAMPLES AND NEGATIVE EXAMPLES, EACH POSITIVE EXAMPLE DESCRIBING A PAIR OF PRIOR EXPRESSIONS THAT BOTH RESULTED IN SELECTION OF A SAME DOCUMENT, AND EACH NEGATIVE EXAMPLE DESCRIBING A PAIR OF PRIOR EXPRESSIONS THAT DID NOT RESULT IN SELECTION OF A SAME DOCUMENT.
1304

GENERATE A MACHINE-TRAINED MODEL, FOR USE BY AN INTENT ENCODER COMPONENT, BY ITERATIVELY DECREASING DISTANCES IN THE INTENT VECTOR SPACE BETWEEN INTENT VECTORS ASSOCIATED WITH POSITIVE EXAMPLES, AND ITERATIVELY INCREASING DISTANCES IN THE INTENT VECTOR SPACE BETWEEN INTENT VECTORS ASSOCIATED WITH NEGATIVE EXAMPLES.
1306

REFINE THE MACHINE TRAINED MODEL BASED ON ADDITIONAL TRAINING EXAMPLES, TOGETHER WITH THE TRAINING EXAMPLES EXTRACTED FROM THE SEARCH LOG, EACH SUCH ADDITIONAL TRAINING EXAMPLE DESCRIBING TWO EXPRESSIONS, TOGETHER WITH A MANUALLY-SUPPLIED LABEL THAT IDENTIFIES WHETHER THE TWO EXPRESSIONS CONVEY A SAME INTENT, AND, IF SO, ARE CONSIDERED PARAPHRASES OF EACH OTHER.
1308

FIG. 13

INTENT ENCODER TRAINED USING SEARCH LOGS

BACKGROUND

Various computer-implemented systems employ machine-trained models to interpret a user's input queries and other linguistic expressions. For instance, a search engine may employ one or more machine-trained models to interpret search queries input by a user via a web browser. Similarly, a chatbot may employ one or more machine-trained models to interpret questions and commands input by a user in spoken or text-based form.

While system providers have developed machine-trained models of increasing sophistication, these models can sometimes produce unsatisfactory results. A system (such as an information retrieval engine) which fails to serve relevant results to the user may frustrate the user. It also makes inefficient use of computing resources, both with respect to the resources associated with the servers which implement the system, and the user device that the user uses to interact with the system.

SUMMARY

A computer-implemented technique is described herein that receives an input expression that a user submits with an intent to accomplish some objective. The technique then uses a machine-trained intent encoder component to map the input expression into an input expression intent vector (IEIV). The IEIV corresponds to a distributed representation of the intent associated with the input expression, within a continuous intent vector space. The technique then leverages the intent vector to facilitate some downstream application task, such as the retrieval of information from a search engine.

According to one illustrative aspect, a training system trains the intent encoder component, in part, by formulating training examples from a search log produced by a search engine. The training examples include positive examples and negative examples. Each positive example describes a pair of prior queries that resulted in selection of a same document (that is, a same URL). Each negative example describes a pair of prior queries that did not result in selection of a same document. The technique generates a machine-trained model, for use by the intent encoder component, by iteratively decreasing distances in the intent vector space between intent vectors associated with positive examples, and iteratively increasing distances in the intent vector space between intent vectors associated with negative examples.

According to another illustrative aspect, an application may use a neighbor search component to find one or more related expressions with respect to the input expression, each of which has a neighbor expression intent vector (NEIV) within a prescribed distance of the IEIV.

According to another illustrative aspect, the intent encoder includes: a machine-trained term-embedding component and a machine-trained mix encoder component. The term-embedding component generates a term vector for each term of an input expression. It does so based on a consideration of the term as a whole and the individual characters which compose the term. The mix encoder component includes a sequential encoder which generates the intent vector associated with the expression based on the term vectors generated by the term-embedding component.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4 shows an information retrieval application that uses the intent encoder component of FIG. 1 to retrieve document identifiers that are relevant to an input query.

FIG. 5 shows an information retrieval application that uses the intent encoder component of FIG. 1 to provide query suggestions to a user.

FIG. 7 shows an information retrieval application that analyzes a sequence of queries submitted by the user during a search session, and the intent vectors associated therewith.

FIG. 8 is a graph which describes the similarity among pairs of queries submitted in the same search session, with respect to a plurality of different search sessions.

FIG. 13 is a flowchart that describes one process for training the intent encoder component of FIG. 1.

Figure 1:
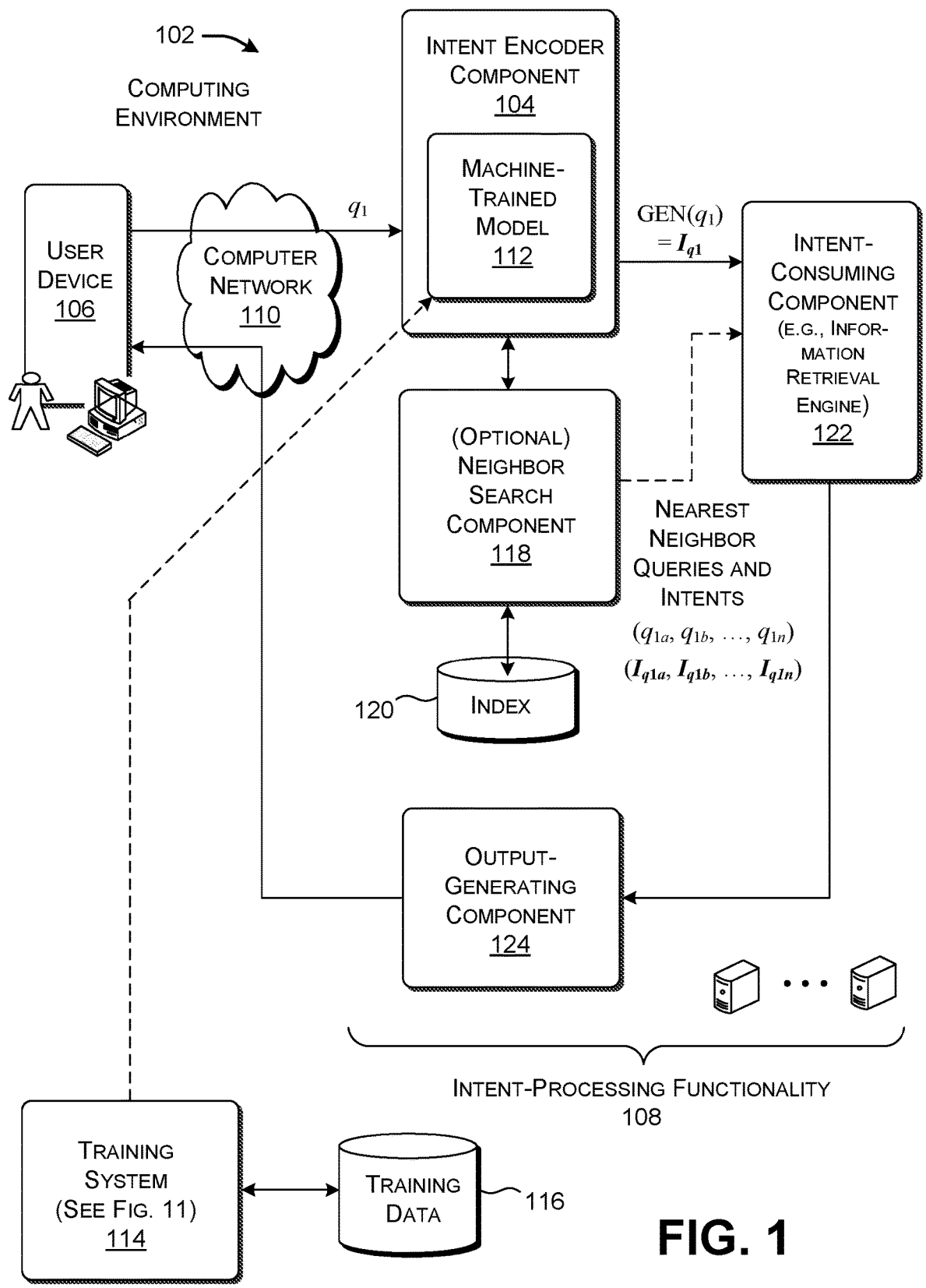
FIG. 1 shows an illustrative computing environment that uses an intent encoder component to map an input query (or any other kind of linguistic expression) into an intent vector. The computing environment then processes the intent vector to produce some application-specific output result.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative computing environment for training and applying an intent encoder component. It also describes an illustrative architecture of the intent encoder component itself. Section B sets forth illustrative methods which explain the operation of the computing environment of Section A. And Section C describes illustrative computing functionality that can be used to implement any aspect of the features described in Sections A and B.

As a preliminary matter, the term "hardware logic circuitry" corresponds, at least in part, to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section C provides additional information regarding one implementation of the hardware logic circuitry. Each of the terms "component" and "engine" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuity of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing Environment

A.1. Overview of the Computing Environment

As noted above, system providers have developed machine-trained models of increasing sophistication. But these models can sometimes produce unsatisfactory results. For example, the meaning of an input query may depend on the order of terms in the input query. For instance, a user who submits the query "horse racing" wishes to obtain different information from a user who submits the input query "racing horse." A model that uses a bag-of-words paradigm to process these queries may therefore produce unsatisfactory results.

Other models process a user's query by mapping it into a semantic vector in a semantic vector space. These types of models are generally more resilient to the ordering of terms in the query. But these models may still fail to accurately address the reason the user has submitted a query. For example, a user may submit a query that reads, "Harvard studio apartments," with the objective of finding an apartment for an upcoming school year at Harvard University in Boston, Mass. A machine-trained model may determine that this query is semantically close to the phrase "Cornell studio apartments." In response, the model, may output information regarding apartments near Cornell University. But the user's true intent is not to research the general topic of housing provided by universities, but to perform the concrete task of finding an apartment in Boston, Mass. To address this problem, an information retrieval system may use a custom intent classification model to classify the user's intent with respect to a predefined taxonomy of known user intents. But it is labor-intensive to develop and maintain these kinds of models. Moreover, these models may perform poorly with respect to intents not encompassed by their predefined intent taxonomies.

This Detailed Description provides a technical solution to the above-noted challenge, among other challenges.

FIG. 1 shows an illustrative computing environment 102 that uses an intent encoder component 104 to map an input linguistic expression into an intent vector, also referred to as an input expression intent vector (IEIV). The linguistic expression may correspond to a search string composed of one or more search terms, a natural language question, a natural language command, etc. However, to facilitate explanation, this Detailed Description will explain the operation of the intent encoder component 104 in the context of a query $q_1$ submitted to a search engine, virtual assistant, chatbot, etc. In that context, the intent encoder component maps the query $q_1$ into an intent vector $I_{q1}$.

The intent vector $I_{q1}$ corresponds to a distributed representation of the intent associated with the input query $q_1$. The intent vector is said to be a "distributed representation"

because the intent is expressed using a plurality of output values, associated with the intent vector's respective k dimensions. For example, assume that user inputs a first query $q_1$ that reads, "Seattle football team." The user may have submitted this query with the objective of determining the name of the football team that plays in the Seattle region. The intent vector $I_{q1}$ produced by the intent encoder component 104 expresses this intent using a set of values associated with its respective dimensions, produced, in turn, by a plurality of neurons of a neural network (to be described in Subsection A.3 below). A different set of values produced by those same neurons conveys a different intent.

Each intent vector lies within a continuous k-dimensional vector space, referred to herein as an intent vector space. The intent encoder component 104 is trained such that it maps queries having similar intent to the same region of the intent vector space. For example, assume that the user inputs a second query with the same intent as the first, reading, "which football team is in Seattle." Further assume that many other users have previously submitted a similar query to find the name of the football team that plays in Seattle. In this case, the intent encoder component 104 will map the second query to a similar region of the intent vector space as the first query ("Seattle football team"), even though these two queries have a significant degree of lexical variance.

Now consider the case in which a user inputs a third query, "Atlanta football team." This query is lexically and semantically related to first query ("Seattle football team"). But the user likely inputs this third query with a somewhat different intent than the first query. In the first query, the user wishes to determine the name of the football team that calls Seattle its home, while, in the third query, the user wishes to determine the name of the football team that plays in Atlanta, Ga. The intent encoder component 104 can therefore be expected to produce an intent vector for this third query that lies farther away from the first query's intent vector, compared to the second query's intent vector. This example highlights the principal characteristic of the intent vector space; its purpose is to primarily express relationships among query intents, not query semantics. It may be the case that two queries that are related by intent are also semantically related. But the driving force in training the intent encoder component 104 is intent, not semantics. Any semantic similarity that is manifested is incidental.

A user may input the query using any kind of input device associated with a user device 106, such as a key input device, a microphone in conjunction with a voice recognition component, etc. The user device 106 itself may correspond to any type of user computing devices, such as a desktop computing device, a laptop computing device, a handheld computing device of any type (such as a smartphone, a tablet-type computing device, etc.), a game console, a wearable computing device, a mixed-reality device, and so on.

In the example shown in FIG. 1, the user device 106 interacts with intent-processing functionality 108 via a computer network 110. The intent-processing functionality 108 generally refers to that part of the computing environment 102 which produces and uses intent vectors. The computer network 110 can correspond to a wide area network (such as the Internet), a local area network, one or more point-to-point links, etc. The intent-processing functionality 108 itself may be implemented by one or more servers, provided at one or more locations. In another implementation, the user device 106 implements one or more aspects of the intent-processing functionality 108.

The intent encoder component 104 operates based on a machine-trained model 112 produced by a training system 114. Subsection A.3 describes one illustrative architecture of the intent encoder component 104. Subsection A.4 describes one illustrative strategy employed by the training system 114 for producing the machine-trained model 112. By way of overview, the training system 114 culls training examples from a search log produced by a search engine, and stores the training examples in a data store 116. The training examples include positive examples and negative examples. Each positive example describes a pair of prior queries that both resulted in selection of a same document (e.g., the same URL). Each negative example describes a pair of prior queries that did not result in selection of a same document. More colloquially stated, the training system 114 mines the training examples from co-click data maintained by the search engine. Each positive example describes one or more occasions in which two different queries resulted in at least one user "clicking on" the same document or documents. Each negative example describes two queries that did not result in users clicking on the same document or documents. The training system 114 produces the machine-trained model 112 by iteratively decreasing distances in the intent vector space between intent vectors associated with positive examples, and iteratively increasing distances in the intent vector space between intent vectors associated with negative examples. As will be described in Subsection A.4, the training system 114 optionally refines the machine-trained model 112 by performing training based on additional manually-labeled training examples. The computing environment 102 can implement the training system 114 using any type of computing device or devices.

Some implementations of the computing environment 102 also include a neighbor search component 118. When invoked, the neighbor search component 118 finds any neighbor query intent vectors (NEIVs) within a specified distance of a given intent vector (which serves as a search key), such as the intent vector associated with the input query $I_{q1}$. The neighbor search component 118 can determine the distance between the two intent vectors in intent vector space using cosine similarity or some other distance metric. The cosine similarity between any two vectors (A,B) is defined as $(A \cdot B)/(\|A\| \|B\|)$.

In some implementations, the neighbor search component 118 can use an approximate nearest neighbor (ANN) technique to find intents that are within a prescribed radius of a given seed intent. Examples of ANN techniques include: various kinds of locality-sensitive hashing (LSH) techniques; various tree partition techniques; various neighborhood-based techniques, and so on. One tree-based technique, for example, uses k-means clustering to partition intent vectors into successively smaller regions. The technique represents these clusters as a hierarchical tree. The neighbor search component 118 finds those intent vectors that are closest to a given seed intent vector (e.g., $I_{q1}$) by traversing the tree from its root node to its leaf nodes. One neighborhood-based technique (the Hierarchical Navigable Small World (HNSW) algorithm) organizes intent vectors in a series of levels. Advancing from the top to bottom, the levels have links (between intent vectors) of successively smaller length. The neighbor search component 118 finds those intent vectors that are closest to a given seed intent vector by traversing the levels from top to bottom. The neighbor search component 118 begins its search on each level at an intent vector identified by the neighbor search component 118 in the preceding layer (if any). These examples are cited by way of illustration, not limitation; the neighbor search component 118 can apply any ANN technique to locate neighboring intent vectors, given a specified seed intent vector. Background information regarding the general topic of ANN, as applied to general datasets, can be found in Wen Li, et al., "Approximate Nearest Neighbor Search on High Dimension Data—Experiments, Analyses, and Improvement," arXiv:1610.02455v1 [cs.DB], Oct. 8, 2016, 26 pages.

To perform its operation, the neighbor search component 118 relies on an index provided in a data store 120. The index provides a data structure that organizes the intent vectors in the intent vector space. For instance, with respect to one tree-based technique, the index represents a hierarchical tree of clusters that can be iteratively traversed by the neighbor search component 118.

An intent-consuming component 122 represents any application-specific functionality that relies on the intent vectors generated by the intent encoder component 104 (and/or by the neighbor search component 118) to perform some application-specific task. Subsection A.2 (below) describes five examples of intent-consuming components that use intent vectors to facilitate an information retrieval operation, to provide an information retrieval result. But the range of intent-consuming applications is not restricted to the field of information retrieval. For example, a sentiment analysis component can determine the sentiment associated with a user's utterance based on multiple factors, including the intent of the user's utterance, as expressed by an intent vector computed by the intent encoder component 104. The computing environment 102 can leverage that sentiment analysis model in some context other than information retrieval.

In many cases, the intent-consuming component 122 provides one or more machine-trained models that operate on plural input items, including the intent vector information provided by the intent encoder component 104. In this sense, it may be said that these downstream machine-trained models operate "on top" of the analysis performed by the intent encoder component 104.

An output-generating component 124 provides some output result to the user based on the analysis performed by the intent-consuming component 122. To cite merely one example, assume that the intent-consuming component 122 leverages the neighbor search component 118 to find a set of queries that express the same intent as the user's current query. The output-generating component 124 can generate a user interface presentation that presents these queries to the user in the form of suggestions. The user may use these suggestions as a guide in formulating his or her next query. Note that the output-generating component 124 may be a component that is internal or external to the intent-consuming application 122.

Figure 2:
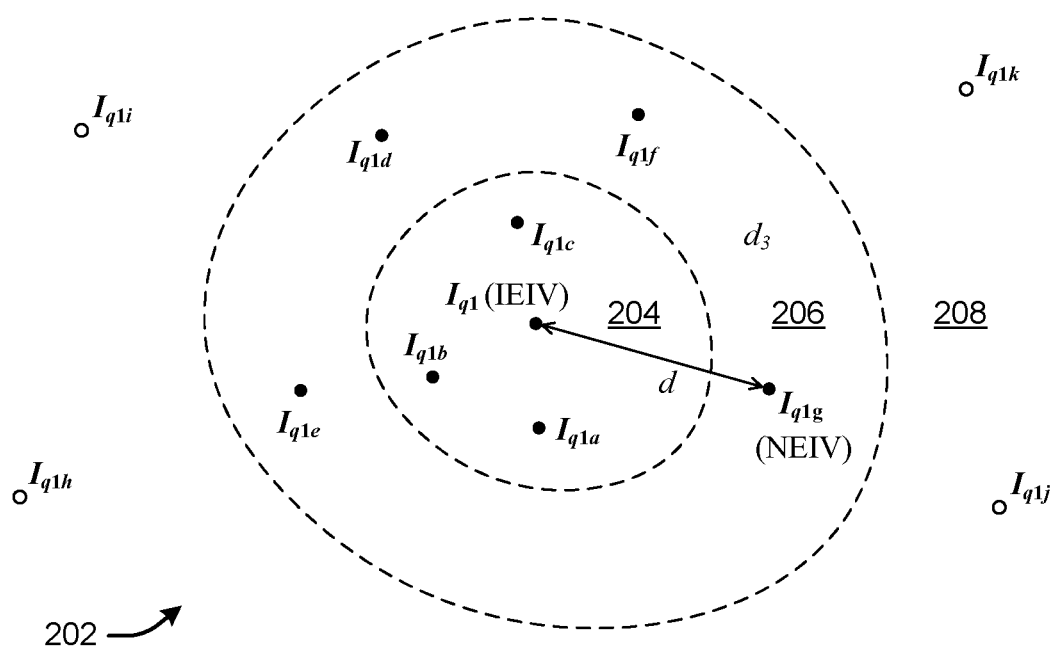
FIG. 2 shows a simplified depiction of an intent vector space, to which the intent encoder component of FIG. 1 maps input queries.

FIG. 2 shows a simplified depiction of an intent vector space 202, to which the intent encoder component 104 of FIG. 1 maps input queries. (The depiction of the space is simplified because the space has k dimensions, while FIG. 2 represents it using only two dimensions.) Assume that the user's input query is again represented as $q_1$, and its corresponding intent vector is $I_{q1}$, also referred to as the input expression intent vector (IEIV). Further assume that the neighbor search component 118 identifies a set of intent vectors within a prescribed distance of the intent vector $I_{q1}$, including $I_{q1a}, I_{q1b}, \ldots, I_{q1g}$. (The subscript "q1i" indicates that an intent vector is neighbor i to the intent vector associated with query $q_1$.) The neighboring intent vectors, in turn, are respectively associated with queries $q_{1a}, q_{1b}, \ldots, q_{1g}$. More generally, each neighboring intent, associated with a neighboring query, is referred to herein as a neighbor expression intent vector (NEIV). The distance d between each NEIV and the intent vector $I_{q1}$ (the IEIV) represents the extent of similarity between these two vectors. An intent-consuming application can use any metric to compute this distance, such as cosine similarity.

In some applications, a first region 204 of the intent vector space contains intent vectors that express the same intent as the intent vector $I_{q1}$, with some application-specific degree of tolerance. In many cases, the intent vectors in this space 204 correspond to queries that are paraphrases of $q_1$. Some of these neighboring queries may also be lexically similar to $q_1$. A second region 206 (which is to be understood as excluding the first region 204) contains intent vectors that express intents that are related to the intent vector $I_{q1}$, but less so than the intent vectors in the first region 204. A third region 208 contains vectors that may be considered as expressing unrelated intents to the intent vector $I_{q1}$. Different applications can draw from different regions in finding neighboring queries with respect to $q_1$. For instance, a query suggestion application may offer query suggestions mined from region 206. It may exclude queries pulled from region 204 because they may represent trivial modifications of the seed query $q_1$.

In conclusion to Subsection A.1, the computing environment 102 offers various technical advantages over other kinds of machine-trained tools for analyzing linguistic expressions. For instance, the computing environment 102 improves the quality of search results provided by an information retrieval engine, relative to other machine-trained tools, by accurately modeling the objective that the user is attempting to accomplish in performing a search. This contributes to good user experience. Further note that the intent encoder component 104 assesses the intent which underlies an input expression without the use of a predefined taxonomy of intent categories. This allows the intent encoder component 104 to dynamically evolve to capture new intents, insofar as these new intents are exhibited in its training data.

The computing environment 102 also provides an efficient technique for retrieving information. This is because the computing environment 102 quickly assesses the true intent of the user, allowing it to quickly provide relevant search results to the user. This, in turn, may reduce the number of searches performed by a user in a search session. Reducing the number of searches in a session consequently reduces the computing resources required to answer a user's question.

Addition merits of the computing environment 102 are set forth in the following subsections.

A.2. Illustrative Information Retrieval Applications

Figure 3:
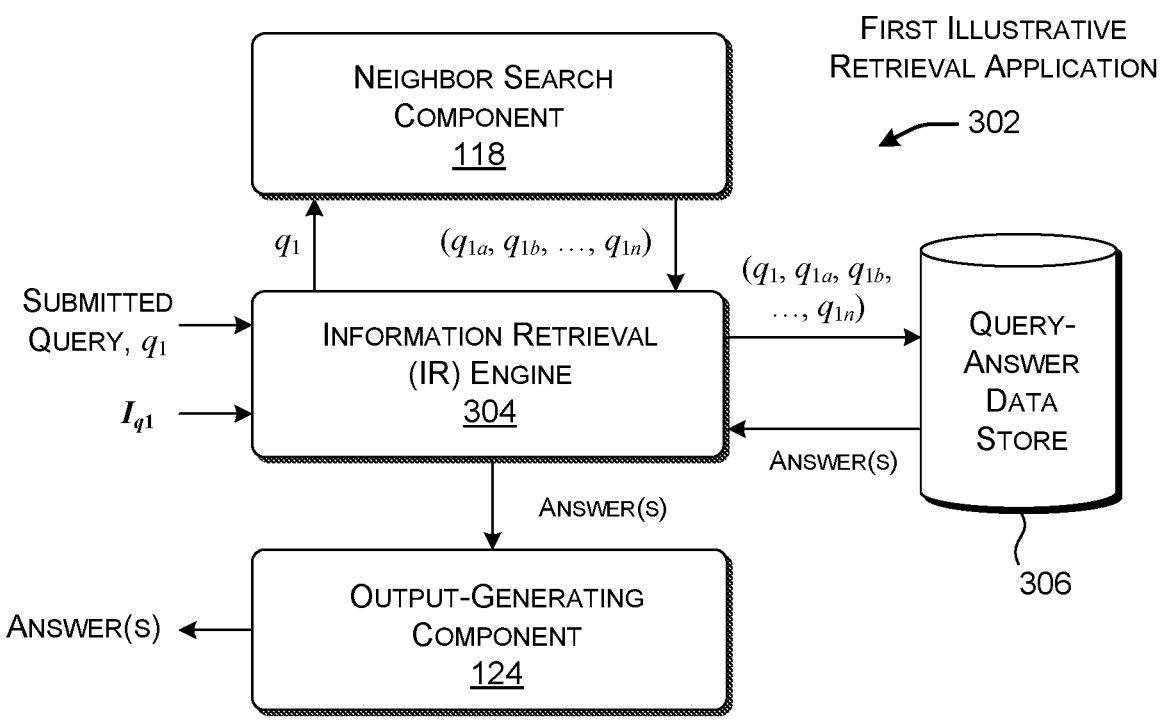
FIG. 3 shows an information retrieval application that uses the intent encoder component of FIG. 1 to retrieve an answer to an input query.

FIG. 3 shows a first information retrieval (IR) application 302 in which an IR engine 304 uses the intent encoder component 104 of FIG. 1 to retrieve an answer to an input query $q_1$, expressed as a question. For example, the IR engine 304 may correspond to a part of a search engine that handles queries from users that are specifically formulated as questions, such as "What is the height of the Eiffel Tower?" Or the IR engine 304 may correspond to functionality which supports a virtual assistant or a specialized chatbot, etc.

In one implementation, assume that the IR engine 304 provides answers to questions based on pre-generated pairs of questions and answers provided in a data store 306. That is, the IR engine 304 finds a question in the data sore 306 that best matches an input question, and the serves the answer associated with that matching question. In other cases, the IR engine 304 can rely on other logic to answer questions. For example, the IR engine 304 can use a generative machine-trained model to map a question into an answer without the use of an explicit set of pre-generated questions and answers. This kind of generative model is nevertheless trained based on a large corpus of previous questions and answers.

The IR engine 304 of FIG. 3 can operate in different ways. In one merely illustrative manner of operation, assume that the IR engine 304 receives the query $q_1$ from the user. It also receives an intent vector $I_{q1}$ from the intent encoder component 104, which describes the intent of the input query $q_1$. Then assume that the IR engine 304 attempts to match the query with one of the previously answered questions in the data store 306. The IR engine 304 can perform this task in various ways. In one case, the IR engine 304 compares the distance between the intent vector associated with the input query ($I_{q1}$) with the intent vector associated with each question in the data store 306 (where that intent vector can be computed and stored in advance, in offline fashion). It then selects the question having an intent that is closest to the current intent vector $I_{q1}$, but only if that closest distance is below a prescribed matching threshold value.

In another case, the IR engine 304 can score each candidate question (in relation to the input query $q_1$) based on multiple factors, such as lexical-based features, semantic features, intent-based features, and/or other features. For instance, the IR engine 304 can assign a score to each candidate question as a weighted sum of these different factors. The IR engine 304 then selects the candidate question having the highest score, presuming again that the highest score satisfies a prescribed relevance threshold value. (Additional information regarding this latter mode of operation is provided below with reference to FIG. 6.)

Whatever matching algorithm is used, assume that the IR engine 304 discovers that that the user's input question $q_1$ does not match any question in the data store 306 with a prescribed degree of confidence. In this case, the IR engine 304 can consult the neighbor search component 118 to find a set of neighboring queries ($q_{1a}$, $q_{1b}$, . . . , $q_{1n}$) that have intent vectors ($I_{q1a}$, $I_{q1b}$, . . . , $I_{q1n}$) that are within a prescribed distance of the intent vector $I_{q1}$ associated with the current query $q_1$. The IR engine 304 then retrieves the answer from the data store 306 associated with the closest neighboring query. (Presume that the data store 306 stores the answers to each of the neighboring queries because they have been previously encountered on one or more occasions.) The output-generating component 124 then serves the retrieved answer to the user. In another implementation, the IR engine 304 can retrieve plural answers (associated with plural neighboring queries) from the data store 306, and the output-generating component 124 can serve those plural answers.

More generally, note that the first IR application 302 provides a way of addressing tail queries, or, more generally tail expressions. Tail queries are queries that the IR engine 304 has never encountered before, or only rarely encountered on previous occasions. The first IR application 302 performs this task by using the intent encoder component 104 to determine the intent vector $I_{q1}$ of the input query $q_1$, and then finding one or more other queries that express the same or similar intent as the current input query. Without this provision, the IR application 302 would fail to provide a useful answer to the user's question.

FIG. 4 shows a second IR application 402 that applies the same principle as the first IR application 302 (of FIG. 3), but applies the principle to the retrieval of information items (e.g., documents) from a data store. That is, an IR engine 404 receives a search query $q_1$ from the user. It also receives the intent vector $I_{q1}$ associated with this query from the intent encoder component 104. The IR engine 404 can then interact with a search index (in a data store 406) to find information items that match the input query $q_1$. A crawling component (not shown) can compile the search index based on its periodic exploration of information items (e.g., documents) stored in one or more data stores 408. For instance, the data stores 408 may represent the distributed informational resources provided by a wide area network (such as the Internet). Assume that the search index stores various information regarding each document that it represents, such as its URL, together with its lexical, semantic, and intent-based features, etc.

The IR engine 404 can use any algorithm to compare the user's current query to information in the index. For example, like the case explained above for FIG. 3, the IR engine 404 can identify a matching information item by comparing the intent vector $I_{q1}$ associated with the present query $q_1$ with the intent vector associated with each candidate information item (which is stored in the search index in advance). It can then choose a set of information items that are closest to the current query in intent vector space. Or the IR engine 404 can apply multiple factors to compare the current input query with the candidate information items. For instance, the IR engine 404 can generate a score for each candidate information item based on a weighted sum of various lexical, semantic, intent-based features, and/or other features, and then pick a set of information items having the highest scores. (Additional information regarding this latter mode of operation is provided below with reference to FIG. 6.)

Assume, however, that the IR engine 404 discovers that it cannot find any information items that match the current query with a prescribed degree of confidence. In response, the IR engine 404 again consults the neighbor search component 128 to find queries that express the same intent as the current input query. It then uses one or more of these queries to retrieve a set of matching information identifiers from the search index. For example, the IR engine 404 can use the top-ranking neighboring query as a surrogate user query, and retrieve the identifiers (e.g., URLs) of the information items that are relevant to this surrogate user query.

Like the first IR application 302, the second IR application 402 works based on the assumption that the neighbor search component 118 identifies neighboring queries that are known, meaning that they have been encountered in prior searches more than a prescribed number of times. The second IR application 402 also assumes that the search index stores robust metadata for each neighboring query that can be identified by the neighbor search component 118. For this reason, the IR engine 404 can generate high-confidence search results based on neighboring queries identified by the neighbor search component 118. In another implementation, the neighbor search component 118 can store information regarding the frequency at which each neighboring query has been previously encountered in prior searches. The IR engine 404 can leverage this frequency information by weighting the confidence it assigns to each neighboring query.

The output-generating component 124 then generates a user interface presentation that notifies the user of the matching information items, e.g., by generating and presenting a list of search result snippets. Each search result snippet shows the title, URL, and representative text (and/or image content) associated with a matching information item. A user may retrieve an information item by selecting its corresponding search result snippet, e.g., by "clicking" on the snippet.

In summary, like the first IR application 302, the second IR application 402 can effectively handle the user's submission of tail queries, corresponding to queries that the IR engine 404 has not encountered before, or only rarely encountered on previous occasions.

FIG. 5 shows a third IR application 502 that represents a variation of the second IR application 402. In this case, an IR engine 504 again addresses a user's input query by searching an index (in a data store 506). A crawling component (not shown) again maintains the search index by periodically exploring information items in data stores 508. Further assume that the IR engine 504 consults the neighbor search component 118 when it discovers that it cannot answer the user's current query with a prerequisite degree of confidence.

Instead of (or in addition to) searching the search index based on the neighboring queries, the IR engine 504 sends one or more of the neighboring queries to a suggestion-generating component 510 provided by the output-generating component 124. The suggestion-generating component 510 then offers one or more of these neighboring queries to the user as query suggestions. For example, for the input query, "Pike Street Event Parking," the suggestion-generating component 510 can generate the query suggestion, "Parking lots near Seattle Convention Center," or "Pike Street Convention Parking," etc. In one implementation, the suggestion-generating component 510 can present one or more of these suggestions beneath a query input box in a browser interface page. The user may activate a query suggestion by clicking on it, or retyping it in the input box.

Figure 6:
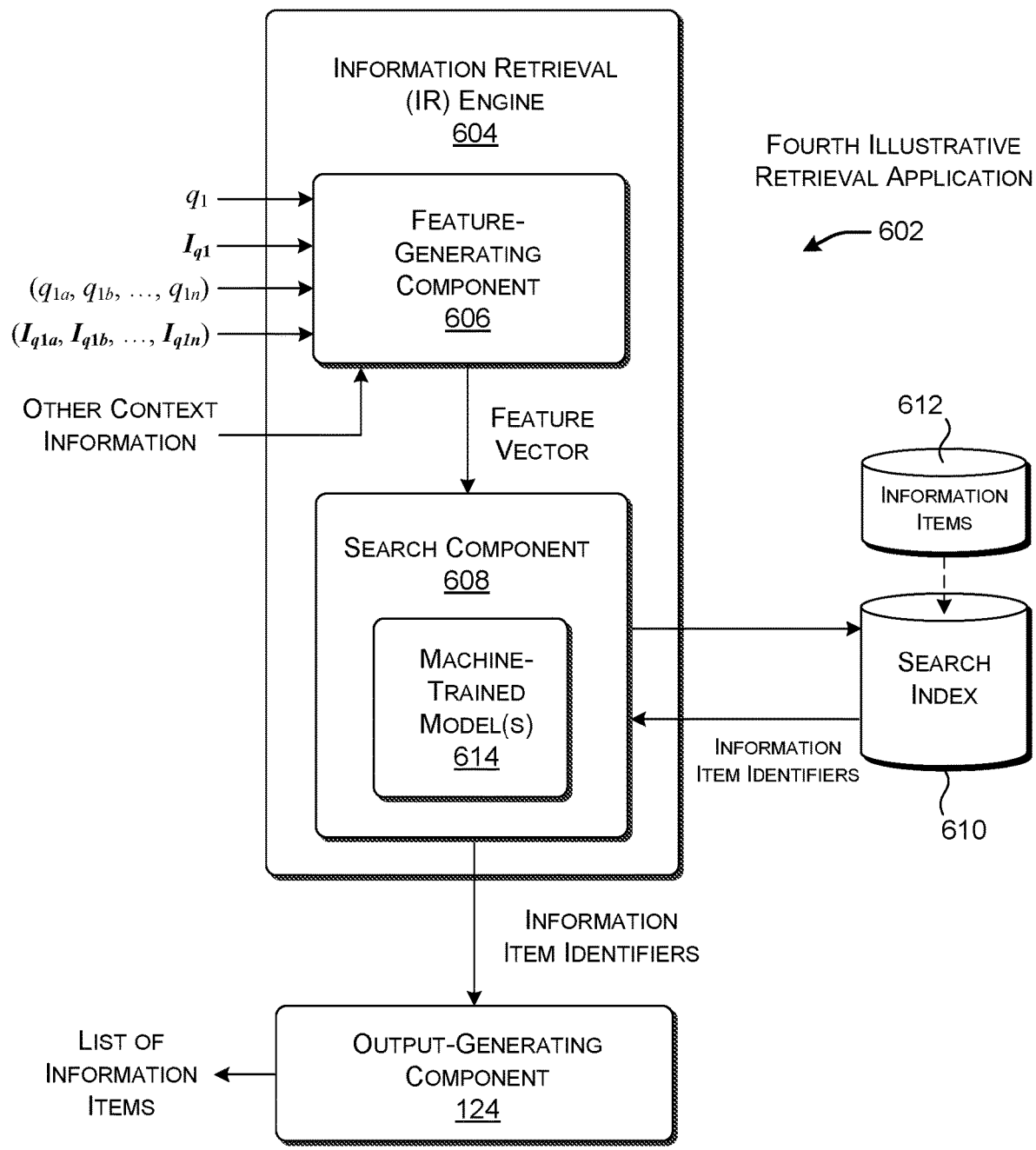
FIG. 6 shows another information retrieval application that relies on a feature-generating component to generate a feature vector that describes the user's input query, part of which is based on an intent vector associated with the input query.

FIG. 6 shows a fourth IR application 602 that uses the intent-based analysis of the intent encoder component 104 as just one input signal within a more encompassing search algorithm. In this case, an IR engine 604 uses a feature-generating component 606 to produce a feature vector that describes an input query $q_1$. The feature vector includes a combination of features that describe the query $q_1$. At least some dimensions of the feature vector specifically describe the intent-related aspects of the query, such as the intent vector $I_{q1}$, and (optionally) the intent vectors ($I_{q1a}$, $I_{q1b}$, ..., $I_{q1n}$) associated with the input query's neighboring queries ($q_{1a}$, $q_{1b}$, ..., $q_{1n}$). Other dimensions of the feature vector can describe the lexical and semantic features of the input query. Still other dimensions of the feature vector can describe environment-based features, such as the time that the query was submitted, the place that the query was submitted, the characteristics of the user who submitted the query, and so on. The feature-generating component 606 can compile the feature vector in various ways, such as by concatenating digital representations of its various component features. A search component 608 can then examine a search index (in a data store 610) to find a set of information items that match the input query, as represented by its feature vector. Again, a crawling application (not shown) maintains the search index by periodically exploring information items in data stores 612.

In some implementations, the search component 608 can use one or more machine-trained models 614 to perform its search. For example, the search component 608 can use a deep neural network (DNN) to map the feature vector into a query vector in a vector space. Here, the query vector is derived based on the intent vector $I_{q1}$ as one input signal, but also may represent other facets of the query besides intent. Assume that the search index stores query vectors associated with candidate information items that have been similarly computed in an offline manner. The search component 608 can then identify a set of information items having query vectors that are closest to the query vector associated with the current query $q_1$. It then sends identifiers (e.g., URLs) associated with these information items to the output-generating component 124. The output-generating component 124 can then generate a user interface presentation that shows a set of search result snippets to the user, associated with the set of matching information items.

The IR engine 504 can use many other strategies that leverage the intent vector(s) provided by the intent encoder component 104. The IR application 602 of FIG. 6 represents just one example of an application that uses an intent query as one factor within a more encompassing retrieval strategy.

FIG. 7 shows an IR application 702 that uses the intent encoder component 104 of FIG. 1 to assist a user in retrieving information by analyzing a sequence of queries submitted by the user during a search session, and the intent vectors associated therewith. More specifically, assume that the user is conducting a search session to address one or more search objectives. In the course of the search session, assume that the user submits a series of queries ($q_1$, $q_2$, ..., $q_3$) at different respective times during the session ($t_1$, $t_2$, ..., $t_n$). An IR engine 704 relies on the intent encoder component 104 to generate an intent vector for each input query, e.g., to provide intent vectors ($I_{q1}$, $I_{q2}$, ..., $I_{q3}$).

A cross-query analysis component 706 can then compute the distance between each pairing of intents in the session. For instance, the cross-query analysis component 706 can compute the distance between each pair of directly-neighboring intents, e.g., by computing the distance between intents associated with queries $q_1$ and $q_2$, the distance between intents associated with queries $q_2$ and $q_3$, etc. The cross-query analysis component 706 can also compute the distances between non-directly-neighboring intents, such as by computing the distance between intents associated with queries $q_1$ and $q_3$, etc. The cross-query analysis component 706 can also generate other metrics which describe the distribution of intents in a session, such as generating a measure that reflects the average intent of a session, the entropy associated with intents expressed during a session, the number of queries that express the same intent, etc. Overall, the cross-query analysis component 706 can generate a feature set that describes the queries, the intents associated with the queries, the relationships among these intents, the statistical attributes of the intents, etc. At least some of the features depend on a temporal trajectory of IEIVs in the current session. In other words, at least some of the features depend on the order in which the user submits queries having different respective intents.

The cross-query analysis component 706 can then interpret the feature set to produce a classification result. For example, the cross-query analysis component 706 can provide a machine-trained model which maps the feature set to a strategy identifier. The strategy identifier describes a strategy that the user appears to be exhibiting at a current time, as evinced by the last query that the user submitted, together which the queries (if any) which preceded it. A first strategy may indicate that the user is expressing a new intent, compared to one or more previous intents exhibited earlier in the search session. A second strategy may indicate that the user is exploring within a region in intent vector space associated with a single intent, but not necessarily drilling down within any specific focus of intent within the space. A third strategy may indicate that the user is attempting to extract more detail regarding a particular intent within the intent vector space. A fourth strategy may indicate that the user is expressing the same intent as a previous query, e.g., by simply paraphrasing a previous query. These strategy possibilities are cited by way of example, not limitation.

The IR engine 704 can leverage its interpretation of the user's current strategy in different ways. In one approach, a search component 708 can add the metadata associated with the identified search strategy as one more feature to take into consideration in extracting information from the search index (provided in a data store 710, which is reflective of information items provided in data stores 712). For example, upon determining that the user has switched intents, the search component 708 can effectively flush its history of the user's previous queries in retrieving matching information identifiers, as the search component 708 has concluded that these previous searches are not relevant to the user's current search objectives. By virtue of this provision, the search component 708 will prevent the previous queries from biasing the current search results. By contrast, upon determining that the user is drilling down into a specific focus of intent, the search component 708 can ask for information items that have been flagged in advance as contained detailed information.

Alternatively, or in addition, the IR component 704 can send its classification result to a suggestion-generating component 714 provided by the output-generating component 124. The suggestion-generating component 714 uses the classification result to give the user suggestions regarding how he or she may best proceed with the search session. For example, upon determining that the user has made one or more attempts to paraphrase the same intent, the suggestion-generating component 714 can provide the user with additional query suggestions, which the search component 708 has mined from the neighbor search component 118. Upon determining that the user is drilling down within a specific focus of intent, the suggestion-generating component 714 can offer query suggestions about how the user may wish to narrow his or her search. For example, the suggestion-generating component 714 can invite the user to visit one or more databases or other resources that contain more detailed information regarding the user's task at hand. The suggestion-generating component 714 can rely on different technology to perform these tasks, such as by consulting a pre-generated lookup table that maps a classification result provided by the cross-query analysis component 706 to search suggestions, or by using a generative machine-trained model, etc.

FIG. 8 is a graph which describes the similarity among pairs of queries submitted in the same search session, with respect to a plurality of different search sessions. A first curve 802 reflects the intent-based similarity between immediately-adjacent queries in the search sessions. A second curve reflects intent-based similarity between non-immediately-adjacent pairs of queries, where each such pair is separated by one query. A third curve also reflects intent-based similarity between non-immediately-adjacent pairs of queries, where each such pair is separated by two queries. A fourth curve describes the similarity between randomly-selected queries.

Note that the curve 802 (for immediately-adjacent queries) has a bi-modal shape, e.g., by exhibiting two probability peaks. The latter peak reflects those occasions in search sessions in which a second query is related to an immediately preceding query, with respect to intent. An IR application that uses a cross-query analysis component 706 can expose and leverage this kind of insight.

The applications described in this subsection have been presented in the spirit of illustration, not limitation. Other IR applications can leverage intent vectors in other ways. Further, as noted above, other intent-consuming applications can apply intent vectors in contexts apart from IR tasks.

A.3. Illustrative Architecture of the Intent Encoder Component

Figure 9:
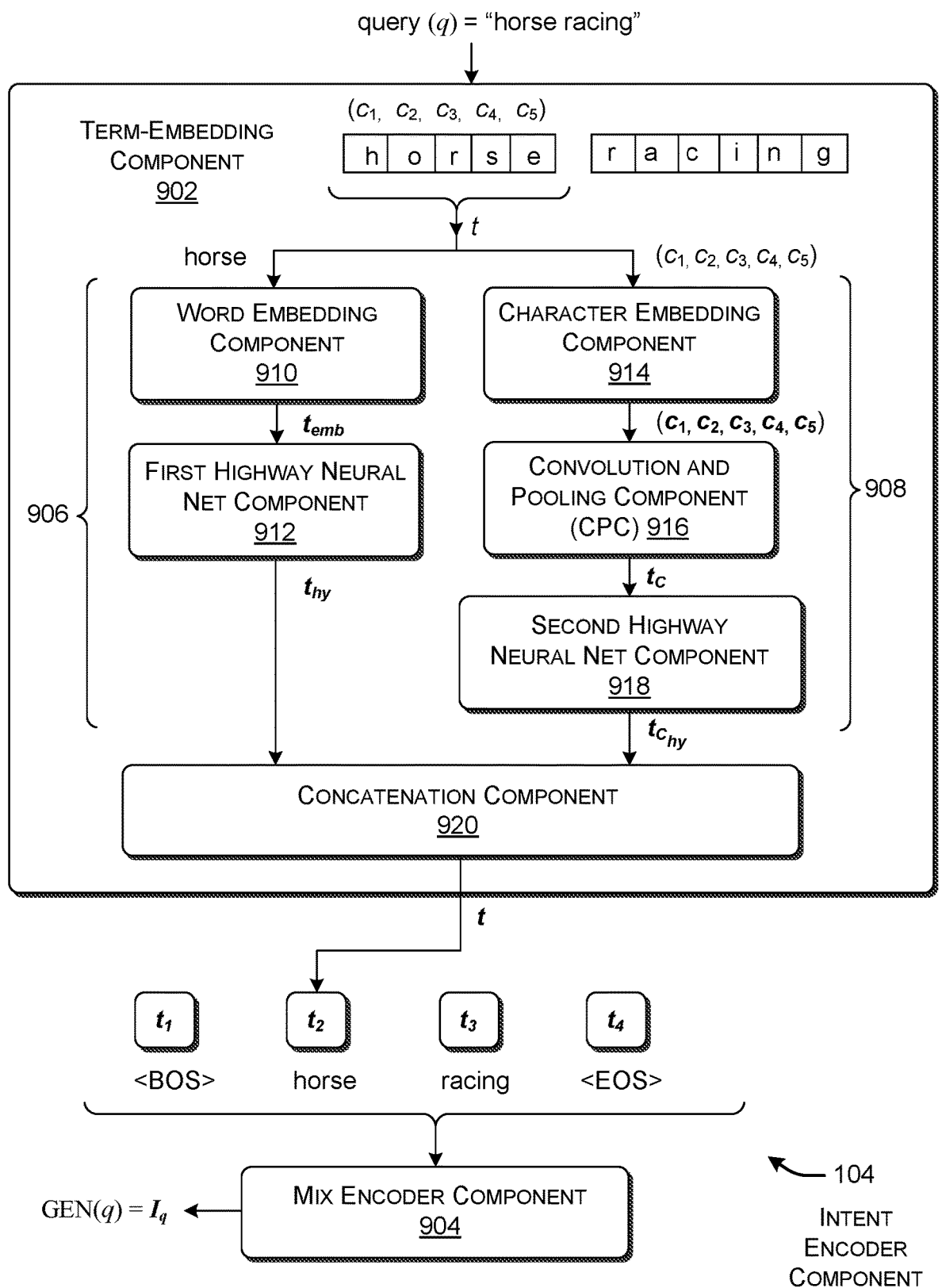
FIGS. 9 and 10 together show one implementation of the machine-trained intent encoder component of FIG. 1.
Figure 10:
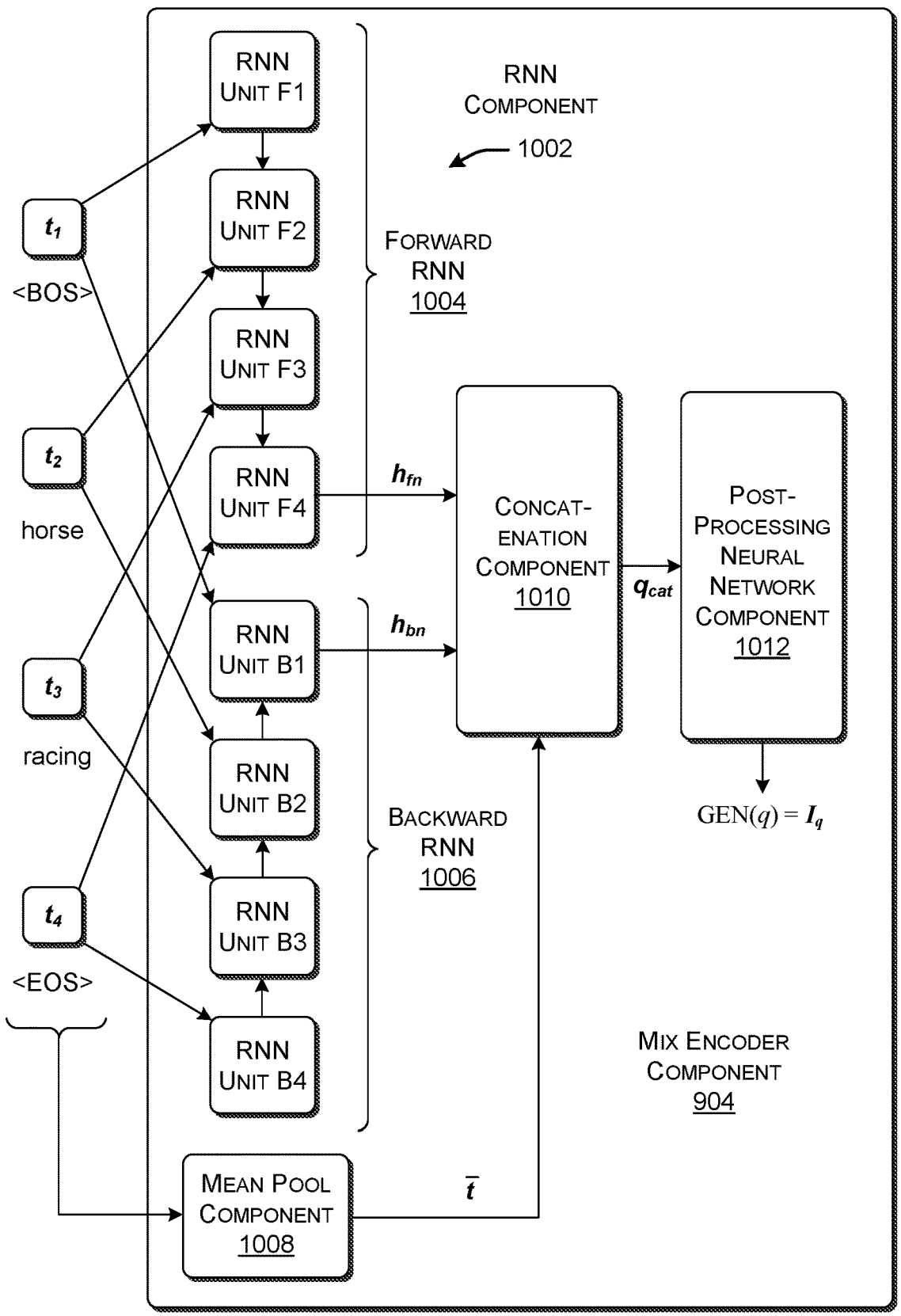

FIGS. 9 and 10 together show one implementation of the machine-trained intent encoder component 104 of FIG. 1. From a high-level perspective, the intent encoder component 104 uses a term-embedding component 902 to generate a term vector t for each term t in an input query q. Here, the input query corresponds to the phrase "horse racing," and its individual terms (also referred to as tokens) correspond to "horse" and "racing." A mix encoder component 904 generates an intent vector $I_q$ based on the term vectors produced by the term-embedding component 902. FIG. 9 shows one illustrative implementation of the term-embedding component 902, while FIG. 10 shows one illustrative implementation of the mix encoder component 904.

Beginning with FIG. 8, the term-embedding component 902 includes two parts. A first part 906 processes each term of the query q as a whole, while a second part 908 operates on each term in a character-level of granularity, e.g., by taking into consideration the morphology of its combination of characters. The second part 908 is particularly useful for the case of a rarely-encountered word; in that situation, the second part 908 extracts meaningful information for the term by judging it against other terms with similar spellings.

As to the first part 906, a word embedding component 910 first converts the input term (here, "horse") into an embedding $t_{emb}$ using an embedding table. The embedding $t_{emb}$ corresponds to a vector representation of the input term t. In one case, the word embedding component 910 relies on a static lookup table which maps terms in a natural language vocabulary to vectors. For example, in an offline operation, a neural network can map each term in the vocabulary to its vector form, thus populating the lookup table. In another case, the training system 114 learns the embedding table as part of its iterative generation of the machine-trained model 112.

A highway neural network component 912 transforms each embedding $t_{emb}$ into an output vector $t_{hy}$ per the equation:

$$t_{hy} = highway^t(t_{emb}, g^t_{hy}, p^t_{hy}) = \qquad (1)$$
$$g^t_{hy}(t_{emb}) \times p^t_{hy}(t_{emb}) + (1 - g^t_{hy}(t_{emb})) \times t_{emb}.$$

This equation provides a non-linear projection, together with a gate which controls the projection. The projection and gate are defined by Equations (2) and (3) below, respectively:

$$p_{hy}^t \text{relu}(w_{p^t_{hy}} \times t_{emb}), \qquad (2)$$

$$g_{hy}^t(t_{emb}) = \text{sigmoid}(w_{g^t_{hy}} \times t_{emb}). \qquad (3)$$

The symbols $w_{p^t_{hy}}$ and $w_{g^t_{hy}}$ in Equations (2) and (3), respectively, refer to machine-learned weighting values. "relu" and "sigmoid" refer to the names of two activation functions.

The second part 908 begins by using a character embedding component 914 to produce a character vector c for each term in the query under consideration, that is, by generating a first character vector $c_1$ for the character "h," a second character vector $c_2$ for the character "o," and so on. Like the word embedding component 910, the character embedding component 914 can use a pre-generated lookup table to perform this task, which maps characters to vectors. Or the character embedding component 914 can learn its embedding table as part of the training performed by the training system 114.

A convolution and pooling component (CPC) 916 next moves an n-character window across the sequence of character vectors. At each window position, it generates an n-character-combination vector which combines together the n characters encompassed by the window at that given position. For example, for n=3, and for one window position, the CPC 916 can form an n-character-combination vector by concatenating the three character vectors for "h," "o," and "r." The CPC 916 can then transform each n-character-combination vector by multiplying it by a machine-learned weighting matrix. Overall this yields a plurality of intermediate vectors. The CPC 916 then condenses the plurality of intermediate vectors into a global vector $t_C$ using any type of down-sampling strategy. For example, CPC 916 can select a maximum value across each dimension of the intermediate vectors fed to it, to form the global character vector $t_C$.

Another highway neural network component 918 transforms the character vector $t_C$ into an output vector $t_{C_{hy}}$ using the same kind of transformation described above with respect to Equations (1)-(3), but with respect to different machine-learned weighting parameters (e.g., here, $p^C_{hy}$ and $g^C_{hy}$). The second highway neural network component 918 can also optionally use two (or more) layers of the highway neural network described in Equations (1)-(3). In this case, any layer w operates on the output result provided by the previous layer w−1.

Finally, a concatenation component 920 concatenates the output result of the first part 906 ($t_{hy}$ with the output result of the second part 908 ($t_{hy}$), to produce the final term vector t. Note that the architecture of the term-embedding component 902 can be varied in different ways, such as by using standard feed-forward neural network components in place of each of the highway neural network components (912, 918).

Advancing to FIG. 10, this figure shows one implementation of the mix encoder component 904. The mix encoder component 904 receives as input signals the set of term vectors produced by the term-embedding component 902. These term vector include a first term vector $t_1$ associated with a dummy symbol <BOS> that marks the beginning of the query, and a fourth term vector $t_4$ associated with a dummy symbol <EOS> that marks the end of the query. Term vector $t_2$ corresponds to the word "horse," while term vector $t_3$ corresponds to the word "racing."

A recurrent neural network (RNN) component 1002 operates on the term vectors to produce two hidden state vectors ($h_{fn}$, $h_{bn}$). More specifically, the RNN component 1002 is a bi-directional RNN that passes hidden state information in both forward and backward directions. That is, the RNN component 1002 incudes a forward RNN component 1004 that passes hidden state information in a forward direction from one RNN unit to the next RNN in a sequence of RNN units. The final RNN unit in the forward RNN component 1004 produces a hidden state vector $h_{fn}$. A backward RNN component 1006 passes hidden state information in a backward direction from one RNN unit to the next RNN in a sequence of RNN units. The final RNN unit in the backward RNN component 1006 produces a hidden state vector $h_{bn}$. Each RNN unit in each RNN component also receives an input signal from one of the term vectors. For instance, the first RNN unit F1 of the forward RNN component 1004 operates on the first term vector $t_1$. Note that, for the purposes of explanation, FIG. 10 illustrates the RNN units in "unrolled" from as discrete elements. But the mix encoder component 904 can implement these RNN units using a single body of code. During execution, that single body of code feeds it output hidden state information (computed at time instance i) as input hidden state information (for time instance i+1). The mix encoder component 904 dynamically expands and contracts the number of RNN calculations it performs based on the number of terms in the input query under consideration.

Each RNN uses its internal logic to produce a hidden state vector, given the hidden state vector output by the previous RNN unit in the chain, and based on the input term vector fed to it. In one implementation, for instance, each RNN unit corresponds to long short-term memory (LSTM) unit which generates its hidden vector $h_i$ based on the equation: $\sigma(W_{th}t_i+W_{hh}h_{i-1}+b_h)$, where $t_1$ is the term vector fed to it as input, $h_{i-1}$ is the hidden state vector fed to it from the previous RNN unit, $W_{th}$ and $W_{hh}$ are machine-learned weighting matrices, $b_h$ is a machine-learned bias vector, and a refers to the sigmoid activation function. In another implementation, each RNN unit corresponds to a gated recurrent unit (GRU).

In general, the RNN component 1002 corresponds to a sequential encoder that captures insight from a query which depends on the order in which terms appear in the query. This is useful for term-order-sensitive queries, such as "horse racing" and "racing horse." By contrast, a mean pool component 1008 uses a bag-of-words paradigm to capture the influence of terms in the query independent of the ordering of the terms. In one case, the mean pool component 1008 generates the average t of the n term vectors that are fed to the mix encoder component 1002. That is:

$$\bar{t} = \frac{1}{n}\sum_i t_i. \qquad (4)$$

Next, a concatenation component 1012 concatenates $h_{fn}$ (the output of the forward RNN component 1004), $h_{bn}$ (the output of the backward RNN component 1006), and $\bar{t}$ (the output of the mean pool component 1008), to produce a vector $q_{cat}$. A post-processing neural network component 1012 then transforms the vector $q_{cat}$ into the final intent vector $I_q$ using the following equation:

$$I_q=\tanh(q_{cat}+\text{relu}(w^q_{rs} \times q_{cat})). \qquad (5)$$

The symbol $w^q_{rs}$ corresponds to another machine-learned parameter value, and tanh and relu correspond to activation functions. Note that the architecture of the mix encoder component 904 can be varied in many ways, such as by using different kinds of sequential encoder technologies (e.g., besides the bi-directional RNN component 1002 shown in FIG. 10), by using a different post-processing neural network component, etc.

A.4. The Training System

Figure 11:
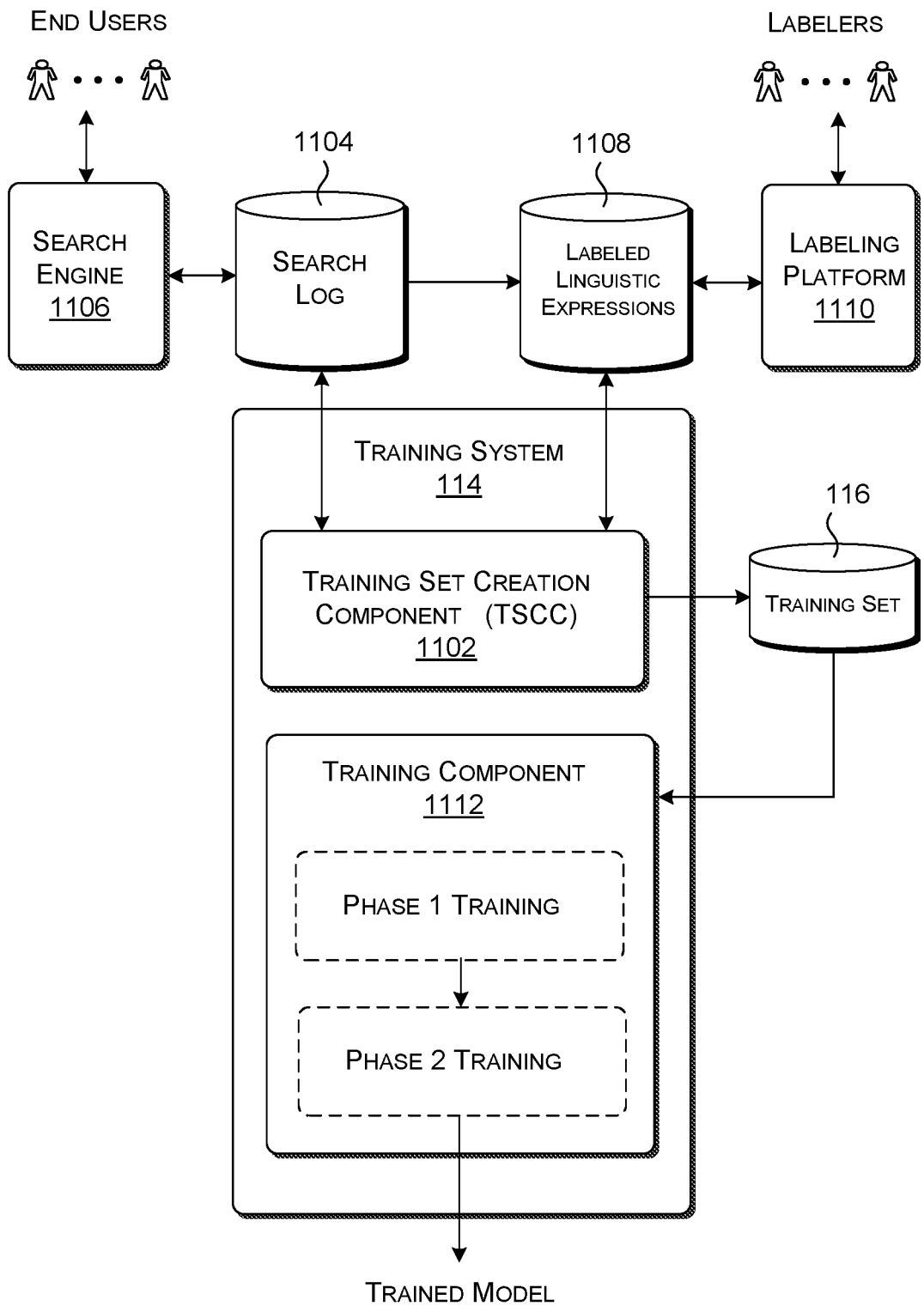
FIG. 11 shows a training system that can be used to train the intent encoder component of FIG. 1.

FIG. 11 shows the training system 114 that produces the machine-trained model 112 used by the intent encoder component 104. The machine-trained model 112, in turn, collectively corresponds to the parameter values which govern the operation of all the machine-learned components shown in FIGS. 9 and 10, as described above. The training system 114 can use any technique to iteratively produce these parameter values, such as gradient descent.

The training system 114 includes a training set creation component (TSCC) 1102 for producing a set of training examples, which it stores in a data store 116. The TSCC 1102 culls the training examples from plural sources. A first source corresponds to a search log, maintained in a data store 1104. A search engine 1106 generates the search log by storing search queries submitted by users and the selections made by users in response to submitting those queries, e.g., by identifying the URLs that the users "clicked" on in response to submitting the queries. For example, the search log will reveal that, in response to submitting a search query q, the user selected a document associated with a document identifier d, e.g., by clicking on the snippet associated with this document in a search results page. The search engine 1106 can maintain this information in any form. For instance, the search engine 1106 can provide a click graph that describes links between search queries and URLs, describing selections made by users in response to the submission of the queries.

The TSCC 1102 can cull a plurality of query pairs from the search log, including plural positive examples and plural negative examples. Each positive example includes a pair of search queries (q, q*) that resulted in clicking on the same information item (e.g., document). Each negative example incudes a pair of search queries (q, q⁻) that did not result in clicking on the same document. Each such pairing, whether corresponding to a positive or negative example, is referred to herein as a co-click pairing.

As to positive examples, the TSCC 1102 can exclude URLs that users clicked on with more than a prescribed number of unique intents (e.g., five intents). The TSCC 1102 culls out these URLs because the intent-click nexus associated with these sites is ambiguous. The TSCC 1102 can generate each negative example by randomly choosing pairs of search queries from the search log. This approach, however, may produce search query pairs that are easy to distinguish, and therefore less useful to train the model. To address this issue, the TSCC 1102 can create each negative example by finding a search query q⁻ that is most similar to a given search query q, as measured by cosine similarity between the intent vectors associated with these two search queries (but wherein these two queries still did not result in clicking on the same document). That is q⁻=argmax$_{q' \in batch}$ cos($I_q$, $I_{q'}$), where "cos" corresponds to the cosine similarity between the intent vectors associated with a candidate search query pair (q, q'). More generally, to create each negative example, the TSCC 1102 finds a pairing of queries having intent vectors that meet a prescribed test of relatedness (such that they are not entirely unrelated), but which still did not result in clicking on the same document.

A second source corresponds to a data store 1108 that provides manually-labeled pairs of linguistic expressions. These pairs of linguistic expressions, in turn, fall into two categories. A first category of linguistic expressions corresponds to search queries submitted to the search engine 1106, each of which is composed of one or more search terms. A second category of linguistic expressions corresponds to natural language questions submitted to some automated question-answering agent, such as the search engine 1106, a virtual assistant, a chatbot, etc.

More specifically, with respect to the first type, each pair of queries includes a first search query $q_i$ and a second search query $q_i'$. Each such pair also includes a label $y_i$ provided by a human expert (via a labeling platform 1110) which indicates whether the two search queries ($q_i$, $q_i'$) express the same intent ($y_i$=+1) or not ($y_i$=−1). In the former case (when the two search queries express the same intent), they are considered paraphrases of each other. With respect to the second type, each pair includes a first question $qe_i$ expressed in a natural language and a second question $qe_i'$ expressed in a natural language. Each such pair includes a label $y_i$ provided by a human expert which indicates whether the two questions ($qe_i$, $qe_i'$) express the same intent ($y_i$=+1) or not ($y_i$=−1). In the former case (when the two questions express the same intent), they are considered paraphrases of each other. The TSCC 1102 adds a prescribed number of these two kinds of pairs to the training set in the data store 116. Each such pairing is referred to herein as a paraphrase pairing.

In one implementation, a training component 1112 performs training in two phases. In a first phase of training, the training component 1112 generates a preliminary version of the machine-trained model 112 based on just the co-click pairings obtained from the search log. This constitutes a weakly supervised form of training because the co-click behavior captured by the search log functions in a manner akin to labels. In a second phase of training, the training component 1112 refines the machine-trained model 112 based on all the pairs, including the co-click pairings ((q, q*), (q, q⁻)), search-query-based paraphrase pairings ($q_i$, $q'_i$, $y_i$), and question-based paraphrase pairings ($qe_i$, $qe'_i$, $y_i$).

More specifically, the first phase uses the following loss equation to train the model 112:

$$L_{co\text{-}click} = \sum_q \frac{1}{1 + \exp(\cos(I_q, I_{q*}))} - \frac{1}{1 + \exp(\cos(I_q, I_{q-}))}. \quad (6)$$

This equation represents an attempt to iteratively increase the similarity between query intents that are deemed related according to the co-click training data, and iteratively reduce the similarity between query intents that are not related according to the co-click training data.

The second phase applies a loss function that represents a composite of three component loss functions: $L_{multi\text{-}task}=L_{co\text{-}click}+L_{q\text{-}para}+L_{qe\text{-}para}$. The first component ($L_{co\text{-}click}$) of this multi-task loss function is applied with respect to the co-click pairings, and is given by Equation (6). The second and third components of this loss function are applied with respect to query-based paraphrase pairings and question-based paraphrase pairings, and are given by Equations (7) and (8) below:

$$L_{q\text{-}para} = \sum_i \frac{1}{1 + \exp(y_i \times \cos(I_{q_i}, I_{q_{i'}}))}, \quad (7)$$

$$L_{qe\text{-}para} = \sum_j \frac{1}{1 + \exp(y_j \times \cos(I_{qe_j}, I_{qe_{j'}}))}. \quad (8)$$

To repeat a statement made at the outset of the Detailed Description, this explanation described the principal aspects of the computing environment 102 in the context of queries, such as queries submitted to the search engine 1106. But the principles described herein more generally apply to any linguistic expression submitted to any computer-implemented platform in any application context.

B. Illustrative Processes

Figure 12:
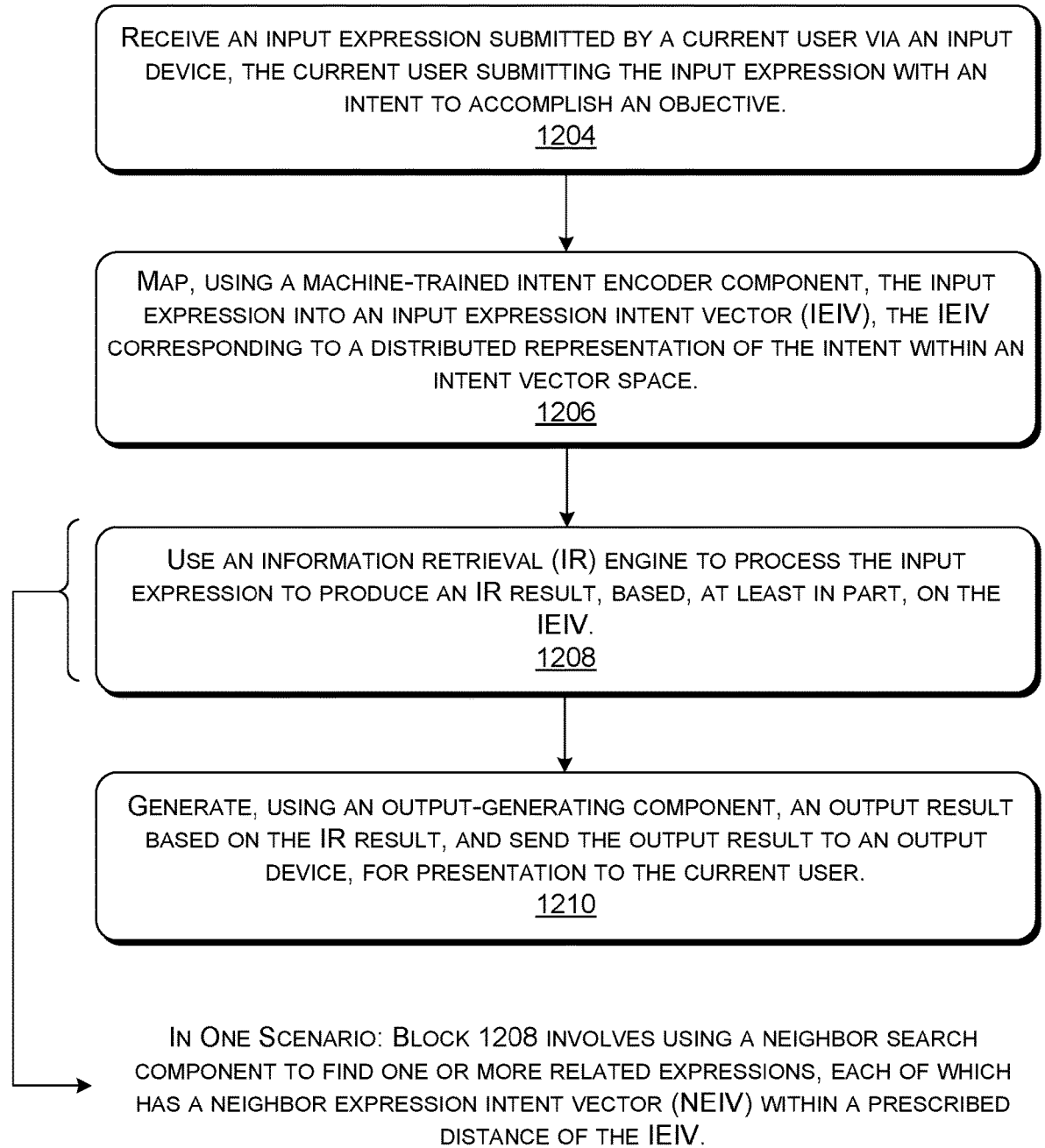
FIG. 12 is a flowchart that describes one process for using the intent encoder component of FIG. 1 to facilitate the retrieval of information.

FIGS. 12 and 13 show processes (1202, 1302) that explain the operation of the computing environment 102 of Section A in flowchart form. Since the principles underlying the operation of the computing environment 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIG. 12 shows a process 1202 for processing an input expression. In block 1204, the intent-processing functionality 108 receives an input expression submitted by a current user via an input device, the current user submitting the input expression with an intent to accomplish an objective. In block 1206, the intent-processing functionality 108 maps, using the machine-trained intent encoder component 104, the input expression into an input expression intent vector (IEIV), the IEIV corresponding to a distributed representation of the intent within an intent vector space. In block 1208, the intent-processing functionality 108 uses an information retrieval (IR) engine to process the input expression, to produce an IR result based, at least in part, on the IEIV. In block 1210, the intent-processing functionality 108 generates, using the output-generating component 124, an output result based on the IR result, and sends the output result to an output device, for presentation to the current user. FIG. 12 also indicates that, in some scenarios, block 1208 entails using a neighbor search component 118 to find one or more related expressions, each of which has a neighbor expression intent vector (NEIV) within a prescribed distance of the IEIV.

FIG. 13 shows a process 1302, performed by the training system 114, for generating a machine-trained model. In block 1304, the training system 114 formulates training examples from a search log produced by a search engine 1106, the training examples including positive examples and negative examples. Each positive example describes a pair of prior expressions that both resulted in selection of a same document, and each negative example describes a pair of prior expressions that did not result in selection of a same document. In block 1306, the training system 114 generates a machine-trained model 112, for use by an intent encoder component 104, by iteratively decreasing distances in the intent vector space between intent vectors associated with positive examples, and iteratively increasing distances in the intent vector space between intent vectors associated with negative examples. In block 1308, the training system 114 optionally refines the machine-trained model 112 based on additional training examples, together with the training examples extracted from the search log. Each such additional training example describes two expressions, together with a manually-supplied label that identifies whether the two expressions convey a same intent, and, if so, are considered paraphrases of each other.

C. Representative Computing Functionality

Figure 14:
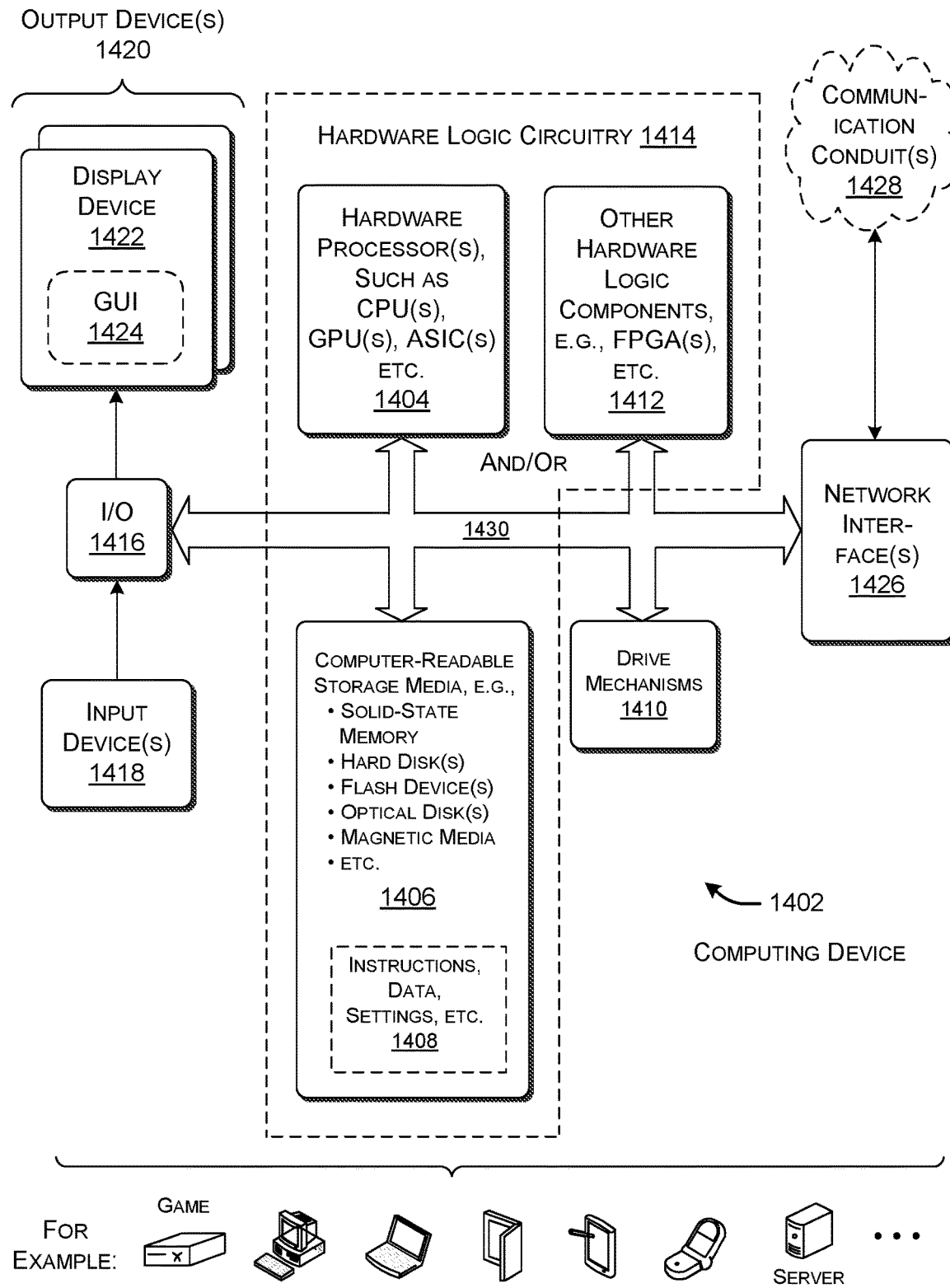
FIG. 14 shows an illustrative type of computing device that can be used to implement any aspect of the features shown in the foregoing drawings.

FIG. 14 shows a computing device 1402 that can be used to implement any aspect of the mechanisms set forth in the above-described figures. For instance, with reference to FIG. 1, the type of computing device 1402 shown in FIG. 14 can be used to implement any computing device associated with the intent-processing functionality 108, any computing device associated with the training system 114, and/or any user computing device (e.g., user device 106), etc. In all cases, the computing device 1402 represents a physical and tangible processing mechanism.

The computing device 1402 can include one or more hardware processors 1404. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1402 can also include computer-readable storage media 1406, corresponding to one or more computer-readable media hardware units. The computer-readable storage media 1406 retains any kind of information 1408, such as machine-readable instructions, settings, data, etc. Without limitation, for instance, the computer-readable storage media 1406 may include one or more solid-state devices, one or more magnetic hard disks, one or more optical disks, magnetic tape, and so on. Any instance of the computer-readable storage media 1406 can use any technology for storing and retrieving information. Further, any instance of the computer-readable storage media 1406 may represent a fixed or removable component of the computing device 1402. Further, any instance of the computer-readable storage media 1406 may provide volatile or non-volatile retention of information.

The computing device 1402 can utilize any instance of the computer-readable storage media 1406 in different ways. For example, any instance of the computer-readable storage media 1406 may represent a hardware memory unit (such as Random Access Memory (RAM)) for storing transient information during execution of a program by the computing device 1402, and/or a hardware storage unit (such as a hard disk) for retaining/archiving information on a more permanent basis. In the latter case, the computing device 1402 also includes one or more drive mechanisms 1410 (such as a hard drive mechanism) for storing and retrieving information from an instance of the computer-readable storage media 1406.

The computing device 1402 may perform any of the functions described above when the hardware processor(s) 1404 carry out computer-readable instructions stored in any instance of the computer-readable storage media 1406. For instance, the computing device 1402 may carry out computer-readable instructions to perform each block of the processes described in Section B.

Alternatively, or in addition, the computing device 1402 may rely on one or more other hardware logic components 1412 to perform operations using a task-specific collection of logic gates. For instance, the hardware logic component(s) 1412 may include a fixed configuration of hardware logic gates, e.g., that are created and set at the time of manufacture, and thereafter unalterable. Alternatively, or in addition, the other hardware logic component(s) 1412 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 14 generally indicates that hardware logic circuitry 1414 includes any combination of the hardware processor(s) 1404, the computer-readable storage media 1406, and/or the other hardware logic component(s) 1412. That is, the computing device 1402 can employ any combination of the hardware processor(s) 1404 that execute machine-readable instructions provided in the computer-readable storage media 1406, and/or one or more other hardware logic component(s) 1412 that perform operations using a fixed and/or programmable collection of hardware logic gates. More generally stated, the hardware logic circuitry 1414 corresponds to one or more hardware logic components of any type(s) that perform operations based on logic stored in and/or otherwise embodied in the hardware logic component(s).

In some cases (e.g., in the case in which the computing device 1402 represents a user computing device), the computing device 1402 also includes an input/output interface 1416 for receiving various inputs (via input devices 1418), and for providing various outputs (via output devices 1420). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1422 and an associated graphical user interface presentation (GUI) 1424. The display device 1422 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1402 can also include one or more network interfaces 1426 for exchanging data with other devices via one or more communication conduits 1428. One or more communication buses 1430 communicatively couple the above-described components together.

The communication conduit(s) 1428 can be implemented in any manner, e.g., by a local area computer network, a wide area computer network (e.g., the Internet), point-to-point connections, etc., or any combination thereof. The communication conduit(s) 1428 can include any combination of hardwired links, wireless links, routers, gateway functionality, name servers, etc., governed by any protocol or combination of protocols.

FIG. 14 shows the computing device 1402 as being composed of a discrete collection of separate units. In some cases, the collection of units may correspond to discrete hardware units provided in a computing device chassis having any form factor. FIG. 14 shows illustrative form factors in its bottom portion. In other cases, the computing device 1402 can include a hardware logic component that integrates the functions of two or more of the units shown in FIG. 1. For instance, the computing device 1402 can include a system on a chip (SoC or SOC), corresponding to an integrated circuit that combines the functions of two or more of the units shown in FIG. 14.

The following summary provides a non-exhaustive set of illustrative aspects of the technology set forth herein.

According to a first aspect, one or more computing devices for processing an input expression are described herein. The computing device(s) include hardware logic circuitry, the hardware logic circuitry including: (a) one or more hardware processors that perform operations by executing machine-readable instructions stored in a memory, and/or (b) one or more other hardware logic components that perform operations using a task-specific collection of logic gates. The operations include: receiving an input expression submitted by a current user via an input device, the current user submitting the input expression with an intent to accomplish an objective; and mapping, using a machine-trained intent encoder component, the input expression into an input expression intent vector (IEIV), the IEIV corresponding to a distributed representation of the intent within an intent vector space. The intent encoder component is trained using a computer-implemented training system by: formulating training examples from a search log produced by a search engine, the training examples including positive examples and negative examples, each positive example describes a pair of prior expressions that both resulted in selection of a same document, and each negative example describing a pair of prior expressions that did not result in selection of a same document; and generating a machine-trained model, for use by the intent encoder component, by iteratively decreasing distances in the intent vector space between intent vectors associated with positive examples, and iteratively increasing distances in the intent vector space between intent vectors associated with negative examples. The operations further include: using an information retrieval (IR) engine to process the input expression to produce an IR result, based, at least in part, on the IEIV; and generating, using an output-generating component, an output result based on the IR result, and sending the output result to an output device, for presentation to the current user.

According to a second aspect, the operation of using the IR engine includes: using a neighbor search component to find one or more related expressions, each of which has a neighbor expression intent vector (NEIV) within a prescribed distance of the IEIV; and using the one or more related expressions to provide the IR engine result.

According to a third aspect, relating to the second aspect, the IR engine finds the one or more related expressions in response to determining that the input expression is a tail expression, corresponding to an expression that has been observed on prior occasions less than a prescribed number of times.

According to a fourth aspect, relating to the second aspect, each related expression has an NEIV that is between a first threshold distance and a second threshold distance from the IEIV.

According to a fifth aspect, relating to the second aspect, the operation of using the one or more related expressions includes identifying one or more questions in a data store that match the one or more related expressions. The IR result corresponds to one or more answers respectively associated with the one or more questions.

According to a sixth aspect, relating to the second aspect, the operation of using the one or more related expressions includes identifying one or more information items specified in a search index that match the one or more related expressions. The IR result corresponds to a set of information item identifiers associated with the one or more information items.

According to a seventh aspect, relating to the second aspect, the IR result corresponds to the one or more related expressions themselves. Further, the operation of generating, performed by the output-generating component, corresponds to generating expression suggestions based on the one or more related expressions.

According to an eighth aspect, the operation of using the IR engine includes: generating a feature vector based, at least in part, on the IEIV; and identifying one or more information items specified in a search index that match the feature vector. The IR result corresponds to a set of information item identifiers associated with the one or more information items.

According to a ninth aspect, the input expression is one expression in a set of input expressions submitted by the current user in a current session. Further, the operation of receiving includes receiving the input expressions in the set. Further, the operation of mapping includes generating an IEIV for each input expression in the set, to generate a set of IEIVs. Further, the operation of using the IR engine includes: analyzing the set of IEIVs to classify a search strategy being used by the current user, to provide a classification result; and performing an action to assist the current user in performing the search strategy based on the classification result.

According to a tenth aspect, relating to the ninth aspect, the operation of analyzing includes identifying the search strategy based on a temporal trajectory of IEIVs in the current session.

According to an eleventh aspect, the intent encoder component includes: a machine-trained term-embedding component that generates a term vector for each term of the input expression; and a machine-trained mix encoder component that includes a sequential encoder which generates the IEIV associated with the input expression based on term vectors generated by the term-embedding component.

According to a twelfth aspect, relating to the eleventh aspect, the term-embedding component generates each term vector for a term based on a consideration of the term as a whole and the individual characters which compose the term.

According to a thirteenth aspect, the training system generates each negative example by identifying two expressions that satisfy a prescribed test of relatedness, yet have not resulted in selection of a same document.

According to a fourteenth aspect, the operation of generating a machine-trained model further includes refining the machine-trained model based on additional training examples, together with the training examples extracted from the search log. Each such additional training example describes two expressions, together with a manually-supplied label that identifies whether the two expressions convey a same intent, and, if so, are considered paraphrases of each other.

According to a fifteenth aspect, relating to the fourteenth aspect, for at least some of the additional training examples, each pair of expressions corresponds to a pair of search queries submitted to a search engine, each of which is composed of one or more search terms.

According to a sixteenth aspect, relating to the fourteenth aspect, for at least some of the additional training examples, each pair of expressions corresponds to a pair of natural language questions.

According to a seventeenth aspect, a method is described, implemented by one or more computing devices, for processing an input expression. The method includes: receiving an input expression submitted by a current user via an input device, the current user submitting the input expression with an intent to accomplish an objective; and mapping, using a machine-trained intent encoder component, the input expression into an input expression intent vector (IEIV), the IEIV corresponding to a distributed representation of the intent within an intent vector space. The intent encoder component is trained using a computer-implemented training system by: formulating training examples from a search log produced by a search engine, the training examples including positive examples and negative examples, each positive example describing a pair of prior expressions that both resulted in selection of a same document, and each negative example describing a pair of prior expressions that did not result in selection of a same document; and generating a machine-trained model, for use by the intent encoder component, by iteratively decreasing distances in the intent vector space between intent vectors associated with positive examples, and iteratively increasing distances in the intent vector space between intent vectors associated with negative examples. The intent encoder component includes: a machine-trained term-embedding component that generates a term vector for each term of the input expression; and a machine-trained mix encoder component that includes a sequential encoder which generates the IEIV associated with the input expression based on the term vectors generated by the term-embedding component.

According to an eighteenth aspect, relating to the seventeenth aspect, the method further includes: using an information retrieval (IR) engine to process the input expression to produce an IR result, based, at least in part, on the IEIV; and generating, using an output-generating component, an output result based on the IR result, and sending the output result to an output device, for presentation to the current user.

According to a nineteenth aspect, relating to the eighteenth aspect, the term-embedding component generates each term vector for a term based on a consideration of the term as a whole and the individual characters which compose the term.

According to a twentieth aspect, a computer-readable medium is described for storing computer-readable instructions. The computer-readable instructions, when executed by one or more hardware processors, perform a method that includes: formulating training examples from a search log produced by a search engine, the training examples including positive examples and negative examples, each positive example describing a pair of prior expressions that both resulted in selection of a same document, and each negative example describing a pair of prior expressions that did not result in selection of a same document; generating a machine-trained model, for use by an intent encoder component, by iteratively decreasing distances in the intent vector space between intent vectors associated with positive examples, and iteratively increasing distances in the intent vector space between intent vectors associated with negative examples; and refining the machine trained model based on additional training examples, together with the training examples extracted from the search log, each such additional training example describing two expressions, together with a manually-supplied label that identifies whether the two expressions convey a same intent, and, if so, are considered paraphrases of each other. The intent encoder component is configured to map input expressions to respective intent vectors, each such intent vector corresponding to a distributed representation of an intent associated with a respective input expression.

A twenty-first aspect corresponds to any combination (e.g., any logically consistent permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for processing an input expression, comprising:
   hardware logic circuitry, the hardware logic circuitry including: (a) one or more hardware processors that perform operations by executing machine-readable instructions stored in a memory, and/or (b) one or more other hardware logic components that perform the operations using a collection of logic gates, the operations including:
   receiving the input expression submitted by a current user via an input device, the current user submitting the input expression with an intent to accomplish an objective, the input expression comprising one or more terms;
   mapping, using a machine-trained intent encoder component, the input expression into an input expression intent vector (IEIV), the IEIV corresponding to a distributed representation of the intent, the IEIV having a plurality of output values expressed within an intent vector space having a plurality of dimensions,
   the intent encoder component having been trained using a computer-implemented training system by:
      formulating training examples from a search log produced by a search engine, the training examples including positive examples and negative examples, each positive example describing a pair of prior expressions that both resulted in selection of a same document, and each negative example describing a pair of prior expressions that did not result in selection of a same document; and
      generating a machine-trained model, for use by the intent encoder component, by iteratively decreasing distances in the intent vector space between intent vectors associated with positive examples, and iteratively increasing distances in the intent vector space between intent vectors associated with negative examples;
   using an information retrieval (IR) engine to process the input expression to produce an IR result, based, at least in part, on the IEIV, the IEIV being produced using the machine-trained model; and
   generating, using an output-generating component, an output result based on the IR result, and sending the output result to an output device, for presentation to the current user.

2. The one or more computing devices of claim 1, wherein the using the IR engine comprises:
   using a neighbor search component to find one or more related expressions, each of which has a neighbor expression intent vector (NEIV) within a prescribed distance of the IEIV; and
   using the one or more related expressions to provide the IR result.

3. The one or more computing devices of claim 2, wherein the IR engine finds the one or more related expressions in response to determining that the input expression is a tail expression, corresponding to an expression that has been observed on prior occasions less than a prescribed number of times.

4. The one or more computing devices of claim 2, wherein the NEIV that is between a first threshold distance and a second threshold distance from the IEIV.

5. The one or more computing devices of claim 2,
   wherein the using the one or more related expressions includes identifying one or more questions in a data store that match the one or more related expressions, and
   wherein the IR result corresponds to one or more answers respectively associated with the one or more questions.

6. The one or more computing devices of claim 2,
   wherein the using the one or more related expressions includes identifying one or more information items specified in a search index that match the one or more related expressions, and
   wherein the IR result corresponds to a set of information item identifiers associated with the one or more information items.

7. The one or more computing devices of claim 2,
   wherein the IR result corresponds to the one or more related expressions, and
   wherein the generating, performed by the output-generating component, corresponds to generating expression suggestions based on the one or more related expressions.

8. The one or more computing devices of claim 1, wherein the using the IR engine comprises:
   generating a feature vector based, at least in part, on the IEIV; and
   identifying one or more information items specified in a search index that match the feature vector, and
   wherein the IR result corresponds to a set of information item identifiers associated with the one or more information items.

9. The one or more computing devices of claim 1,
   wherein the input expression is one expression in a set of input expressions submitted by the current user in a current session,
   wherein the receiving comprises receiving the input expressions in the set,
   wherein the mapping comprises generating an IEIV for each input expression in the set, to generate a set of IEIVs, and
   wherein the using the IR engine comprises:
      analyzing the set of IEIVs to classify a search strategy being used by the current user, to provide a classification result; and performing an action to assist the current user in performing the search strategy based on the classification result.

10. The one or more computing devices of claim 9, wherein the analyzing includes identifying the search strategy based on a temporal trajectory of IEIVs in the current session.

11. The one or more computing devices of claim 1, wherein the intent encoder component includes:
   a machine-trained term-embedding component that generates a term vector for each term of the input expression, to overall produce term vectors; and
   a machine-trained mix encoder component that includes a sequential encoder which generates the IEIV associated with the input expression based on the term vectors generated by the term-embedding component.

12. The one or more computing devices of claim 11, wherein the term-embedding component generates the term vector for each term based on a consideration of the term as a whole and individual characters which compose the term.

13. The one or more computing devices of claim 1, wherein the training system generates each negative example by identifying two expressions that satisfy a prescribed test of relatedness, yet have not resulted in selection of the same document.

14. The one or more computing devices of claim 1,
   wherein the generating a machine-trained model further includes refining the machine-trained model based on additional training examples, together with the training examples extracted from the search log,
   each such additional training example describing two expressions, together with a manually-supplied label that identifies whether the two expressions convey a same intent, and, if so, are considered paraphrases of each other.

15. The one or more computing devices of claim 14, wherein, for at least some of the additional training examples, each pair of expressions corresponds to a pair of search queries submitted to the search engine, each of which is composed of one or more search terms.

16. The one or more computing devices of claim 14, wherein, for at least some of the additional training examples, each pair of expressions corresponds to a pair of natural language questions.

17. A method, implemented by one or more computing devices, for processing an input expression, comprising:
   receiving the input expression submitted by a current user via an input device, the current user submitting the input expression with an intent to accomplish an objective, the input expression comprising one or more terms;
   mapping, using a machine-trained intent encoder component, the input expression into an input expression intent vector (IEIV), the IEIV corresponding to a distributed representation of the intent, the IEIV having a plurality of output values expressed within an intent vector space having a plurality of dimensions,
   the intent encoder component having been trained using a computer-implemented training system by:
      formulating training examples from a search log produced by a search engine, the training examples including positive examples and negative examples,
      each positive example describing a pair of prior expressions that both resulted in selection of a same document, and each negative example describing a pair of prior expressions that did not result in selection of a same document; and
      generating a machine-trained model, for use by the intent encoder component, by iteratively decreasing distances in the intent vector space between intent vectors associated with positive examples, and iteratively increasing distances in the intent vector space between intent vectors associated with negative examples; and
   using an information retrieval (IR) engine to process the input expression to produce an IR result, based, at least in part, on the IEIV, the IEIV being produced using the machine-trained model.

18. The method of claim 17, wherein the method further comprises:
   generating, using an output-generating component, an output result based on the IR result, and sending the output result to an output device, for presentation to the current user.

19. The method of claim 17, wherein the intent encoder component includes:
   a machine-trained term-embedding component that generates a term vector for each term of the input expression, to overall produce term vectors; and
   a machine-trained mix encoder component that includes a sequential encoder which generates the IEIV associated with the input expression based on the term vectors generated by the term-embedding component.

20. The method of claim 19, wherein the term-embedding component generates the term vector for each term based on a consideration of the term as a whole and individual characters which compose the term.

21. A computer-readable storage medium for storing computer-readable instructions, the computer-readable instructions, when executed by one or more hardware processors, performing a method that comprises:
   receiving an the input expression submitted by a current user via an input device, the current user submitting the input expression with an intent to accomplish an objective, the input expression comprising one or more terms;
   mapping, using a machine-trained intent encoder component, the input expression into an input expression intent vector (IEIV), the IEIV corresponding to a distributed representation of the intent, the IEIV having a plurality of output values expressed within an intent vector space having a plurality of dimensions,
   the intent encoder component having been trained using a computer-implemented training system by:
      formulating training examples from a search log produced by a search engine, the training examples including positive examples and negative examples,
      each positive example describing a pair of prior expressions that both resulted in selection of a same document, and each negative example describing a pair of prior expressions that did not result in selection of a same document; and
      generating a machine-trained model, for use by the intent encoder component, by iteratively decreasing distances in the intent vector space between intent vectors associated with positive examples, and iteratively increasing distances in the intent vector space between intent vectors associated with negative examples; and
   using an information retrieval (IR) engine to process the input expression to produce an IR result, based, at least in part, on the IEIV, the IEIV being produced using the machine-trained model.

22. The computer-readable storage medium of claim 21, wherein the method refines the machine trained model based on additional training examples, together with the training examples extracted from the search log, each such additional training example describing two expressions, together with a manually-supplied label that identifies whether the two expressions convey a same intent, and, if so, are considered paraphrases of each other.

* * * * *